US008977779B2

(12) United States Patent
Pratt et al.

(10) Patent No.: US 8,977,779 B2
(45) Date of Patent: Mar. 10, 2015

(54) AUGMENTATIVE AND ALTERNATIVE COMMUNICATION SYSTEM WITH PERSONALIZED USER INTERFACE AND CONTENT

(75) Inventors: Francis J. Pratt, Onekama, MI (US); Kenneth R. Stott, Charlotte, NC (US)

(73) Assignee: MyTalk LLC, Onekama, MI (US)

( * ) Notice: Subject to any disclaimer, the term of this patent is extended or adjusted under 35 U.S.C. 154(b) by 1177 days.

(21) Appl. No.: 12/752,060

(22) Filed: Mar. 31, 2010

(65) Prior Publication Data

US 2010/0250782 A1    Sep. 30, 2010

Related U.S. Application Data

(60) Provisional application No. 61/165,182, filed on Mar. 31, 2009.

(51) Int. Cl.
*G06F 15/16* (2006.01)
*G09B 19/04* (2006.01)
*G06Q 10/10* (2012.01)

(52) U.S. Cl.
CPC .............. *G09B 19/04* (2013.01); *G06Q 10/10* (2013.01)
USPC ........................................ 709/248; 709/200

(58) Field of Classification Search
USPC .................................. 709/248, 200
See application file for complete search history.

(56) References Cited

U.S. PATENT DOCUMENTS

| | | | |
|---|---|---|---|
| 6,970,599 B2* | 11/2005 | Longe et al. ............ | 382/185 |
| 2004/0143430 A1* | 7/2004 | Said et al. ............... | 704/2 |
| 2006/0257827 A1* | 11/2006 | Ellenson .................. | 434/112 |
| 2008/0233546 A1* | 9/2008 | Baker et al. .............. | 434/169 |
| 2009/0300503 A1* | 12/2009 | Suhm et al. .............. | 715/733 |

OTHER PUBLICATIONS

AssistiveWare, "Proloquo2Go: Communication on the Go for iPhone and iPod touch", AssistiveWare, Manual Version 1.2, copyright 2008-2010 David Niemeijer and Samuel Sennott, 34 pages, The Netherlands.
David and Sam PR, "MyTalkTools.com: Competitor Analysis", 17 pages, dated Jul. 19, 2010.
Cheol Yong Ahn, International Search Report for International Patent Application No. PCT/US2010/029514, Korean Intellectual Property Office, dated Nov. 16, 2010.
Cheol Yong Ahn, Written Opinion for International Patent Application No. PCT/US2010/029514, Korean Intellectual Property Office, dated Nov. 16, 2010.

* cited by examiner

*Primary Examiner* — Dustin Nguyen
*Assistant Examiner* — Joel Mesa
(74) *Attorney, Agent, or Firm* — Locke Lord LLP

(57) ABSTRACT

The disclosed methods and systems allow individuals with speech challenges to convey personalized expressive content to others. Implementation is performed on widely available and popular wireless handheld multimedia devices, which may help foster acceptance of the individuals and minimize any perceived differences. Users may easily create and add personalized content to the devices and may quickly customize the content selection interfaces of the devices. These tasks may be accomplished using either the devices themselves via a device-based content authoring tool running locally on the device, or using a Web-based authoring tool on a network server. The Web-based authoring tool allows users to create, capture, and store personalized content and customized content selection interfaces on the network server from virtually any location in the world with network access. The personalized content and customized interfaces may then be downloaded and synchronized automatically on the devices from time to time or as needed.

13 Claims, 30 Drawing Sheets

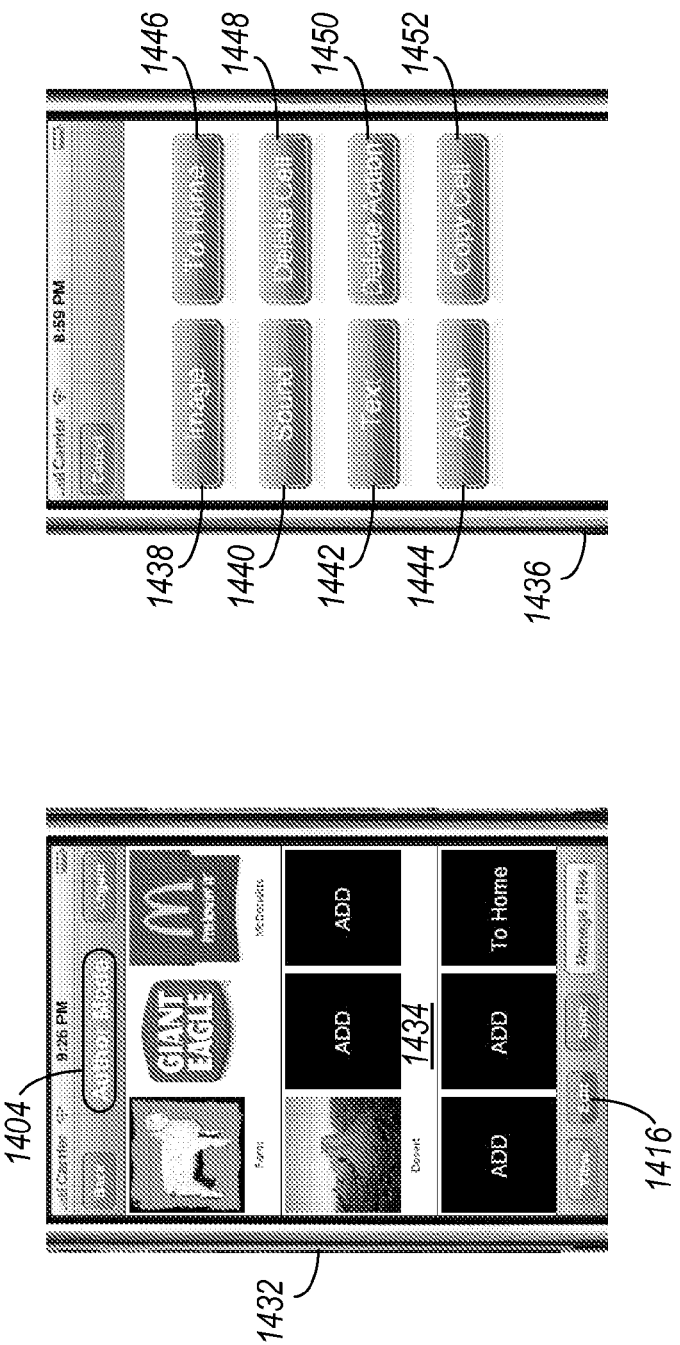

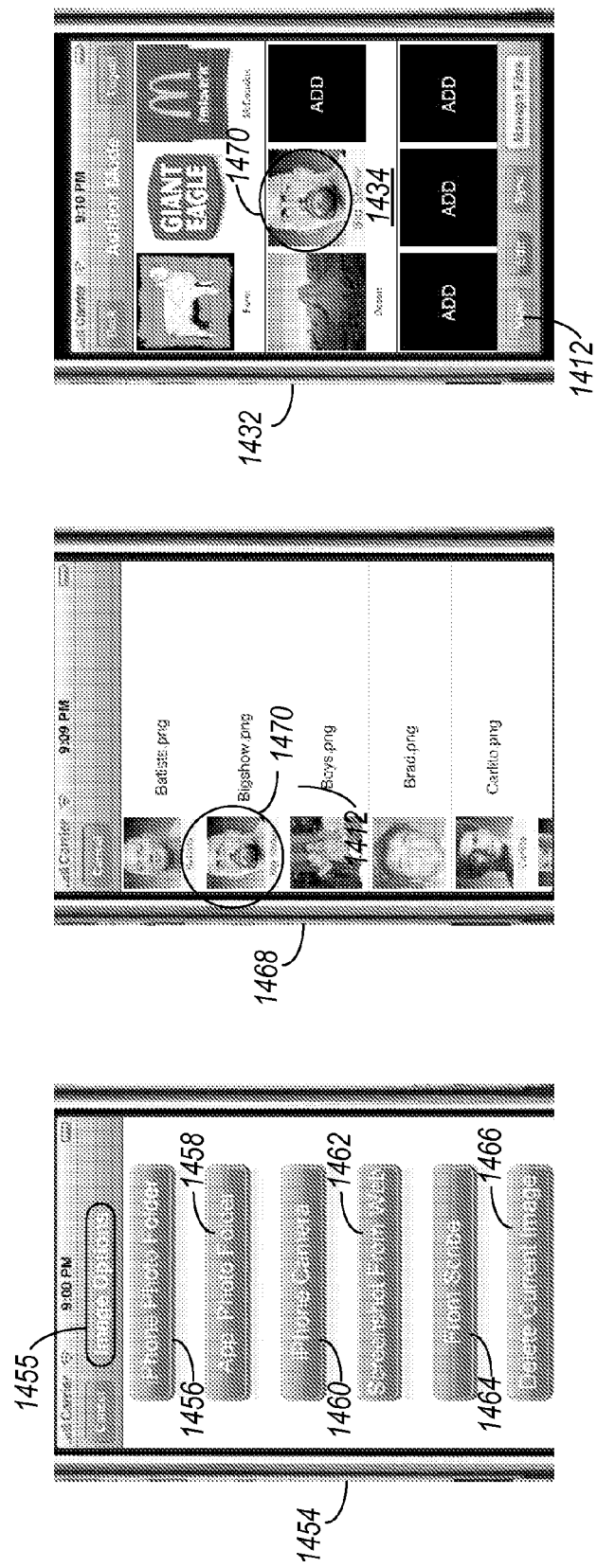

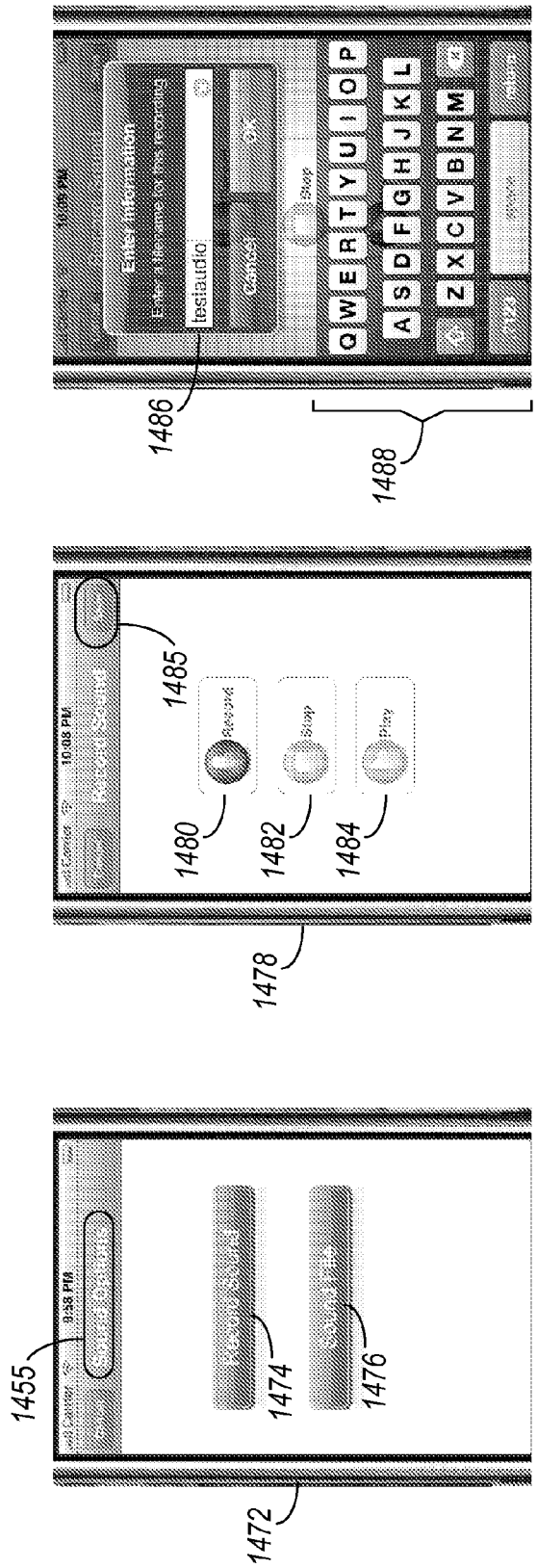

AUGMENTATIVE AND ALTERNATIVE COMMUNICATION SYSTEM WITH PERSONALIZED USER INTERFACE AND CONTENT

CROSS REFERENCE TO RELATED APPLICATIONS

This application for patent claims priority to, and hereby incorporates by reference, U.S. Provisional Application Ser. No. 61/165,182, entitled "An iPhone/Blackberry Storm & sync able Web software application that enables users with expressive language challenges to communicate using the iPhone/iPod Touch (iTouch)/Blackberry Storm together with their own personalized audio visual language set (My Talk Language Set)," filed Mar. 31, 2009.

STATEMENT REGARDING FEDERALLY SPONSORED RESEARCH

Not applicable.

COPYRIGHT NOTIFICATION

Portions of this patent disclosure contain materials that are subject to copyright protection. The copyright owner has no objection to the facsimile reproduction by anyone of the patent document or the patent disclosure as it appears in the Patent and Trademark Office (PTO) patent file or records, but otherwise reserves all copyright rights.

REFERENCE TO APPENDIX

A computer program listing appendix is included as an appendix to this disclosure. The computer program listing was submitted electronically via the PTO EFS-Web system as an ASCII text file with filename "Program_Listing.txt," file size 54,214 bytes, and created on Mar. 29, 2010. The computer program listing is subject to copyright protection and any use or reproduction thereof other than as part of the facsimile reproduction of this patent disclosure is prohibited.

BACKGROUND OF THE INVENTION

1. Field of the Invention

This disclosure relates generally to systems and methods for improving the ability of individuals with speech and language challenges to more effectively communicate with others. In particular, the disclosure relates to augmentative and alternative communication ("AAC") systems and methods that allow such individuals to convey personalized text, audio, video, images, and similar expressive content to others through a customized content selection interface.

2. Description of the Related Art

AAC generally refers to methods of communication that can supplement, or in some instances, replace conventional speech. Such methods range from predefined facial expression, verbalizations, physical gestures, and signed languages in the case of unaided AAC, to synthesized speech and text displayed on electronic devices in the case of aided AAC. These various AAC methods make it possible for individuals with speech and language challenges to better communicate with the population at large, leading to improved social interactions that can enhance the quality of life for everyone involved.

Most modern electronic AAC devices provide the ability for users to define and present text messages as synthesized speech. However, with most electronic existing AAC devices, there is little flexibility to modify the content selection interface of the device. Users are typically limited to whatever interface is provided with the device or with upgrades to the device (if any), which the users typically have to purchase separately. There is no ability to import custom pictures or graphics, either from the user's personal collection or from other sources, such as digital cameras or the World Wide Web ("Web").

Even when existing AAC devices allow a user to add personalized text to the device, doing so tends to be a tedious and time consuming task. This is because the user must use the limited input mechanisms available on the device. These input mechanisms tend to be reduced in size, as the devices are designed to be compact, lightweight, and easily carried by the speech and language challenged individual. For most existing AAC devices, the input mechanisms typically include arrow keys for moving a cursor around a display, an enter key for choosing and entering selections, and an on-screen keyboard for inputting letters and numbers. The compact size of existing AAC devices also limits the features, functionality, and user-friendliness of any graphical interface provided with the device, making it difficult to use.

Similarly, for verbal presentation of the text messages, the user is typically limited to whatever machine voice is provided with the device to synthesize the speech. This is particularly problematic where the individual with the speech and language challenge wishes to employ new jargon or slang words that are not normally available in a synthesized machine voice. There is no option to personalize the speech with either the voice of a parent, a teacher, another support person, or the like, by either recording a new audio segment or importing a prerecorded audio clip containing the desired content.

In addition, most existing AAC devices have proprietary software and/or hardware. As a result, the devices must be returned to their manufacturers or sent to certified technicians when repair is needed. The intervening absence of the device can disrupt communication between the speech and language challenged individual and those supporting him, often for weeks and even months in some cases. This extended disruption can lead to resentment, regression, and increased frustration by everyone involved. And because the software and/or hardware is proprietary, the devices tend to be prohibitively expensive, some costing as much as several thousand dollars. The high cost makes it difficult for average families to purchase a replacement device in the event of a failure or malfunction.

Finally, existing AAC devices tend to be viewed as socially "uncool," particularly by teenagers, young adults, and others to whom perception and image matter acutely. One reason for this perception is that only individuals who are speech and language challenged typically use or have a need for the devices. This exclusivity tends to emphasize rather than minimize any stigma that may be associated with the devices. Another reason is that there is almost never a catchy or clever marketing campaign to promote the devices, either to consumers in general or specific segments thereof. As a result, many speech and language challenged individuals, most of who are already self-conscious to begin with, are reluctant to use existing AAC devices in common social settings.

Accordingly, there is a need for AAC capability on widely accepted and culturally popular (i.e., "cool") devices that also allow users to easily add personalized expressive content to the devices and customize the content selection interface for such expressive content.

SUMMARY OF THE INVENTION

The disclosed embodiments are directed to methods and systems for improving the ability of individuals with speech and language challenges to more effectively communicate. The methods and systems allow such individuals to convey personalized text, audio, video, images, and similar expressive content to others. In one embodiment, the methods and systems are implemented on widely available and culturally popular wireless handheld multimedia devices, which may help foster acceptance of the individuals and minimize any perceived differences between them and other people. Users may easily create and add personalized content to the devices and may quickly customize the content selection interfaces of the devices. These tasks may be accomplished using either the devices themselves via a device-based content authoring tool running locally on the device, or using a Web-based authoring tool hosted on a network server. The Web-based authoring tool allows users to access, edit, create, capture, store, and share personalized content and customized content selection interfaces on the network server from virtually any location in the world with network access. The personalized content and customized content selection interfaces may then be downloaded from the network server and synchronized automatically on the devices from time to time or as needed. In this way, each wireless handheld multimedia device may be updated automatically with the latest personalized content and/or customized content selection interfaces developed for the regular user of that device via the Web-based authoring tool. Such an arrangement allows users to perform authoring tasks using standard keyboards, mice, display screens, and the like, resulting in enormous benefits over existing solutions in terms of ease, accessibility, and overall effort required.

In general, in one aspect, the disclosed embodiments are directed to a method of modifying augmentative and alternative communication (AAC) content for an AAC user. The method comprises transmitting a transmission signal from a network server over a first network connection to a personal computer, the transmission signal representing a graphical interface that is displayed on the personal computer. The graphical interface allows an AAC author to indicate one or more changes to AAC content associated with an AAC content selection interface on the network server using a standard keyboard and a pointing device on the personal computer. The method also comprises receiving a reception signal from the personal computer over the first network connection at the network server, the reception signal representing the changes to the AAC content associated with the AAC content selection interface indicated by the AAC author. The method further comprises modifying the AAC content associated with the AAC content selection interface on the network server according the changes indicated by the AAC author. The method moreover comprises downloading the AAC content associated with the AAC content selection interface that has been modified from the network server over a second network connection to a handheld multimedia device of the AAC user, the AAC content selection interface allowing the AAC user to selectively display and/or play back the AAC content, wherein the AAC author is a different person from the AAC user.

In general, in another aspect, the disclosed embodiments are directed to a method of providing augmentative and alternative communication (AAC) content to an AAC user. The method comprises receiving a reception signal from a network server over a network connection at a handheld multimedia device of the AAC user, the reception signal representing updates selected by an AAC author to an AAC content associated with an AAC content selection interface stored on the handheld multimedia device. The method also comprises updating the AAC content associated with the AAC content selection interface on the handheld multimedia device according to the updates selected by the AAC author and storing updated AAC content associated with the AAC content selection interface on the handheld multimedia device. The method further comprises presenting the AAC content selection interface with the updated AAC content associated with the handheld multimedia device to the AAC user and receiving an input from the AAC user on the handheld multimedia device via the AAC content selection interface. The method moreover comprises displaying and/or playing back the AAC content on the handheld multimedia device upon receiving the input from the AAC user, wherein the AAC author is a different person from the AAC user.

In general, in yet another aspect, the disclosed embodiments are directed to a graphical interface for editing augmentative and alternative communication (AAC) content associated with an AAC content selection interface. The graphical interface comprises a board panel configured to graphically depict a board composed of a plurality of cells, each cell being associated with either an AAC content, a nested board, or both, and configured to display and/or play back the AAC content, display the nested board, or both, when selected on a handheld multimedia device of an AAC user. The graphical interface further comprises a navigation panel adjacent to the board panel and having a plurality of information areas therein and configured to graphically depict information for each cell in the board panel. The graphical interface moreover comprises a library panel configured to graphically depict AAC content that may be associated with the cells in the board panel, wherein AAC content may be associated with a target cell in the board panel by clicking on a graphical depiction of the AAC content in the library, dragging the graphical depiction to the board panel, and dropping the graphical depiction on the target cell in the board panel.

BRIEF DESCRIPTION OF THE DRAWINGS

The foregoing and other advantages of the disclosed embodiments will become apparent from the following detailed description and upon reference to the drawings, wherein:

FIGS. 14A-14M illustrate an exemplary content selection interface as presented by the wireless handheld multimedia device application in accordance with the systems and methods of the present disclosure.

DETAILED DESCRIPTION

The figures described above and the written description of specific structures and functions below are not presented to limit the scope of what has been invented or the scope of the appended claims. Rather, the figures and written description are provided to teach any person skilled in the art to make and use the embodiments for which patent protection is sought. Those skilled in the art will appreciate that not all features of a commercial embodiment are described or shown for the sake of clarity and understanding. Persons of skill in this art will also appreciate that the development of an actual commercial embodiment incorporating aspects disclosed herein will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation, location, and from time to time. While a developer's efforts might be complex and time-consuming in an absolute sense, such efforts would be, nevertheless, a routine undertaking for those of skill in this art having benefit of this disclosure. It must be understood that the principles disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the figures and are not intended to limit the scope of the disclosed embodiments or the appended claims.

Figure 1:
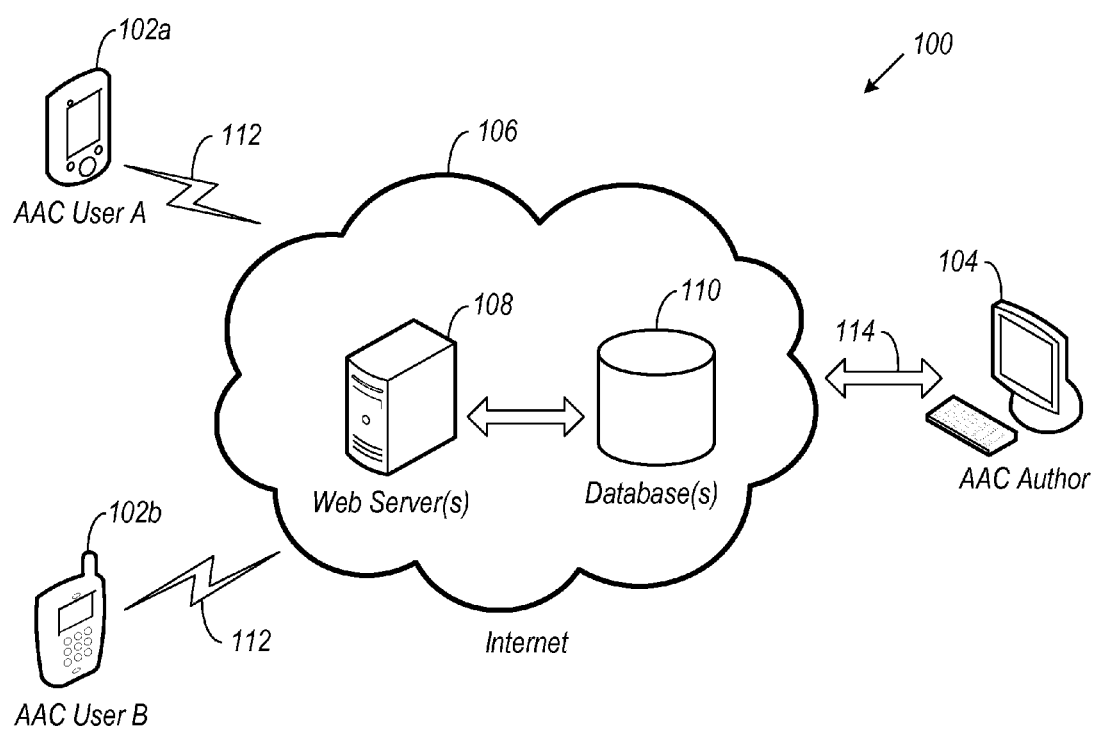
FIG. 1 illustrates an exemplary system and method of the present disclosure.

General Architecture:

Referring now to FIG. 1, a system 100 is shown in which a plurality of wireless handheld multimedia devices 102a and 102b and a personal computer 104 are connected to a computing network 106. The handheld devices 102a and 102b may be any one of several widely available wireless handheld multimedia devices that are capable of installing and running multimedia applications thereon (e.g., music, videos, games, etc.). These handheld devices 102a and 102b preferably, but not necessarily, include a touchscreen to aid user interaction. Examples of suitable wireless handheld multimedia devices include, but are not limited to: the iPhone™ iPod™ Touch, iPad™ and similar devices from Apple, Inc.; the Blackberry Storm™ and similar devices from Research in Motion Ltd.; the Palm Pre™ and similar devices from Palm, Inc.; the Omnia™ and similar devices from Samsung; the Nintendo DS and similar devices from Nintendo Co., Ltd., and the like. Similarly, the personal computer 104 may be any commercially available personal computing device with network access capability that can install and run a Web browser application. These personal computing devices preferably, but not necessarily, include a standard (e.g., QWERTY) keyboard and mouse or similar pointing device (e.g., trackball). Examples of suitable personal computers may include, but are not limited to, desktop computers, laptop computers, notebook computers, netbooks (mini notebooks), and the like.

The wireless handheld multimedia devices 102a and 102b represent or may be used by speech and language challenged users, labeled in FIG. 1 as "AAC User A" and "AAC User B," respectively. These devices 102a and 102b allow the AAC Users A and B to easily display and play back personalized expressive content using a customized content selection interface, all on a device that is widely used by others and generally considered to be "cool" or at least socially normal or accepted. The personal computer 104, on the other hand, represents or may be used by a support person (e.g., parent, teacher, speech therapist, etc.), labeled here as "AAC Author." In the present example, the AAC Author is not necessarily the support person for either of the AAC Users A or B (i.e., he is supporting a third AAC User, not shown). Note that although only two AAC Users A and B and one AAC Author are shown, it should be clear to those having ordinary skill in the art that any number of AAC Users and AAC Authors may access the computing network 106 without departing from the scope of the disclosed embodiments. Thus, for example, one speech and language pathologist, who would be the AAC Author here, may support multiple patients, who would be the AAC Users here. Conversely, one AAC User may be supported by multiple AAC Authors, including his parents, teachers, speech and language pathologist, and so forth.

As used herein, the term "content selection interface" refers to the set of boards and cells that are displayed on the wireless handheld multimedia device 102a or 102b of a given AAC User A or B to allow the AAC User A or B to easily display and/or play back expressive content. The term "boards" refers to grid-like structures that are part of the content selection interface of the wireless handheld multimedia devices 102a and 102b, each board containing one or more user-selectable number of "cells" or boxes. Each cell or box in turn is associated with either expressive content, such as sound, image, video, text, or a combination thereof, or with another board so that there may be child boards within parent boards (i.e., nested boards). It is also possible for a cell or box to be associated with a URL (Universal Resource Locator) as the expressive content. Selecting or pressing (tapping) a cell on the wireless handheld multimedia device 102a or 102b causes the expressive content associated with that cell to be displayed or played back. If the expressive content is a URL, the handheld device 102a or 102b may launch an appropriate browser to that URL. If the cell is associated with a board, the board may be brought up and displayed on the handheld device 102a or 102b.

Referring still to FIG. 1, the computing network 106 may be a private network such as a corporate intranet, or it may be a public network such as the Internet. One or more network servers 108 may be connected to the computing network 106 along with at least one database 110, which may be either an internal database, or a database that resides in a physically separate location from the network servers 108 (as shown here), depending on the constraints (e.g., size, speed, etc.) of the particular implementation. In the present example, the one or more network servers 108 may be Web servers that are individually or jointly capable of hosting a Web-based application over the computing network 106, and the at least one database 110 may be a relational database, operational database, or other suitable database capable of storing data for the Web-based application. The Web-based application, in accordance with the disclosed embodiments, is an AAC authoring tool for allowing the AAC Author to create and add personalized expressive content and to customize the content selection interface is for such content, as described later herein.

Connection to the computing network 106, and thus to the Web servers 108, may be achieved by a wireless connection 112 for the wireless handheld multimedia devices 102a and 102b, and by a broadband connection 114 for the personal computer 104. Examples of suitable wireless connections 112 may include, but are not limited to, any connection conforming to one of several high-speed wireless data communication standards, such as 4G (4th Generation), 3G (3rd Generation), GSM (Global System for Mobile Communications), GPRS (General Packet Radio Service), EDGE (Exchanged Data rates for GSM Evolution), HSDPA (High Speed Downlink Packet Access), and the like. Similarly, examples of a broadband connection 114 may include, but are not limited to, cable, DSL (Digital Subscriber Line), fiber optics, and the like. It is also possible for the handheld devices 102a and 102b and the personal computer 104 to access the computing network 106 using a wireless local area network (WLAN) via a wireless standard such as Wi-Fi, and the like. Therefore, the wireless connections 112 and broadband connection 114 are intended to encompass all such wireless local area network standards as well.

In general operation, the AAC Author uses the personal computer 104 to connect to the computing network 106 and access the one or more Web servers 108 and the Web-based application thereon by entering the URL of the Web servers 108. Once connected, the AAC Author may create personalized expressive content and customized content selection interfaces for the AAC User A and/or B using the Web-based application and a Web browser, standard keyboard, mouse or other pointing device, and full size display. This saves a tremendous amount of time, effort, and aggravation over existing solutions in which the authoring tool has been designed to run on the same handheld device, or the same type of handheld device, used to display or play back the expressive content. The personalized expressive content and/or customized content selection interfaces created for each of the AAC Users A and B may then be downloaded from time to time or as needed to the handheld devices 102a and 102b. The AAC Users A and B may then use the content selection interfaces to selectively present and play back the personalized expressive content on the handheld devices 102a and 102b. And from time to time or as needed, the AAC Users A and B may automatically download and synchronize additional expressive content and content selection interfaces on their handheld devices 102a and 102b with the expressive content and content selection interfaces developed for them, respectively, on the Web servers 108.

It is also possible for the both AAC Users A and B and the AAC Author to locally create personalized content and customize the content selection interfaces directly on the wireless handheld multimedia devices 102a and 102b. The changes on the handheld devices 102a and 102b may in turn be uploaded from time to time or as needed and automatically synchronized with the expressive content and content selection interfaces on Web servers 108. Such an arrangement helps ensure there are at least two copies of the expressive content and content selection interfaces for the AAC Users A and B, thereby reducing the probability of complete data loss in the event of a failure or malfunction either on the wireless handheld multimedia devices 102a and 102b or the Web servers 108.

Figure 2:
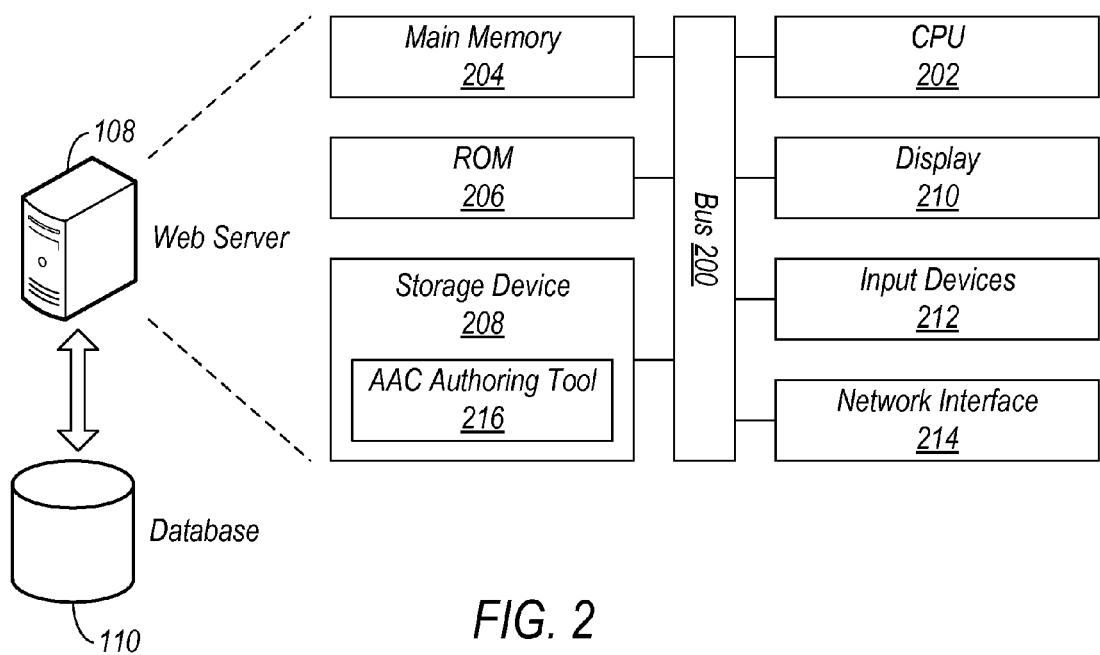
FIG. 2 illustrates an exemplary Web server that may be used with the systems and methods of the present disclosure.

FIG. 2 illustrates an exemplary Web server 108 that may be used as one of the one or more Web servers on the computing network 106. This Web server 108 may be any suitable computing system known to those having ordinary skill in the art, including a high-end personal computer, workstation, mainframe, and the like, running Windows Server, Mac OS X Server, Linux, FreeBSD, Solaris, Unix, z/OS, and the like. Such a Web server 108 typically includes a bus 200 or other communication mechanism for transferring information within the Web server 108 and a CPU 202 coupled with the bus 200 for processing the information. The Web server 108 may also include a main memory 204, such as a random access memory (RAM) or other dynamic storage device coupled to the bus 200 for storing computer readable instructions to be executed by the CPU 202. The main memory 204 may also be used for storing temporary variables or other intermediate information during execution of the instructions to be executed by the CPU 202. The Web server 108 may further include a read only memory (ROM) 206 or other static storage device coupled to the bus 200 for storing static information and instructions for the CPU 202. A computer readable storage device 208, such as a magnetic disk or optical disk, may be coupled to the bus 200 for storing information and instructions for the CPU 202.

The term "computer readable instructions" as used above refers to any instructions that may be performed by the CPU 202 and/or other components. Similarly, the term "computer readable medium" refers to any storage medium that may be used to store the computer readable instructions. Such a medium may take many forms, including, but not limited to, non-volatile media, volatile media, and transmission media. Non-volatile media may include, for example, optical or magnetic disks, such as the storage device 208. Volatile media may include dynamic memory, such as main memory 204. Transmission media may include coaxial cables, copper wire and fiber optics, including wires of the bus 200. Transmission itself may take the form of acoustic or light waves, such as those generated during radio frequency (RF) and infrared (IR) data communications. Common forms of computer readable media may include, for example, a floppy disk, a flexible disk, hard disk, magnetic tape, other magnetic medium, a CD ROM, DVD, other optical medium, a RAM, a PROM, an EPROM, a FLASH EPROM, other memory chip or cartridge, or any other medium from which a computer can read.

The CPU 202 may also be coupled via the bus 200 to a display 210, such as a liquid crystal display (LCD), cathode ray tube (CRT), and the like for displaying information to a user. One or more input devices 212, including alphanumeric and other keyboards, mouse, trackball, cursor direction keys, and so forth, may be coupled to the bus 200 for communicating information and command selections to the CPU 202. A network interface 214 provides two-way data communication between the Web server 108 and other computers over the computing network 106. In one example, the network interface 214 may be an integrated services digital network (ISDN) card or a modem used to provide a data communication connection to a corresponding type of telephone line. As another example, the network interface 214 may be a local area network (LAN) card used to provide a data communication connection to a compatible LAN. Wireless links may also be implemented via the network interface 214. In summary, the main function of the network interface 214 is to send and receive electrical, electromagnetic, optical, or other signals that carry digital data streams representing various types of information.

Web-Based AAC Authoring Tool:

In accordance with the disclosed embodiments, a Web-based AAC authoring tool 216, or rather the computer-readable instructions therefor, may also reside on the storage device 208. The computer-readable instructions for the AAC authoring tool 216 may then be executed by the CPU 202 and/or other components of the Web server 108. The AAC authoring tool 216 allows an AAC Author to perform personalization of expressive content for an AAC User and customization of his content selection interface over the computing network 106. Such an AAC authoring tool 216 may be implemented using any suitable application development environment and programming language known to those having ordinary skill in the art, including, but not limited to, environments like Microsoft Silverlight or Cocoa Framework from Apple, Inc., and languages like C++ or Objective-C from Apple, Inc. As for the data created and used by the AAC authoring tool 216, this data may be stored in the database 110, which may also reside on the storage device 208, or it may reside in a physically separate location from the Web server 108 (as shown here). In one implementation, the AAC authoring tool 216 may be offered as an online service, either free of charge or as a fee-based service. Following is a description of an exemplary implementation of the AAC authoring tool 216 according to the disclosed embodiments.

Figure 3:
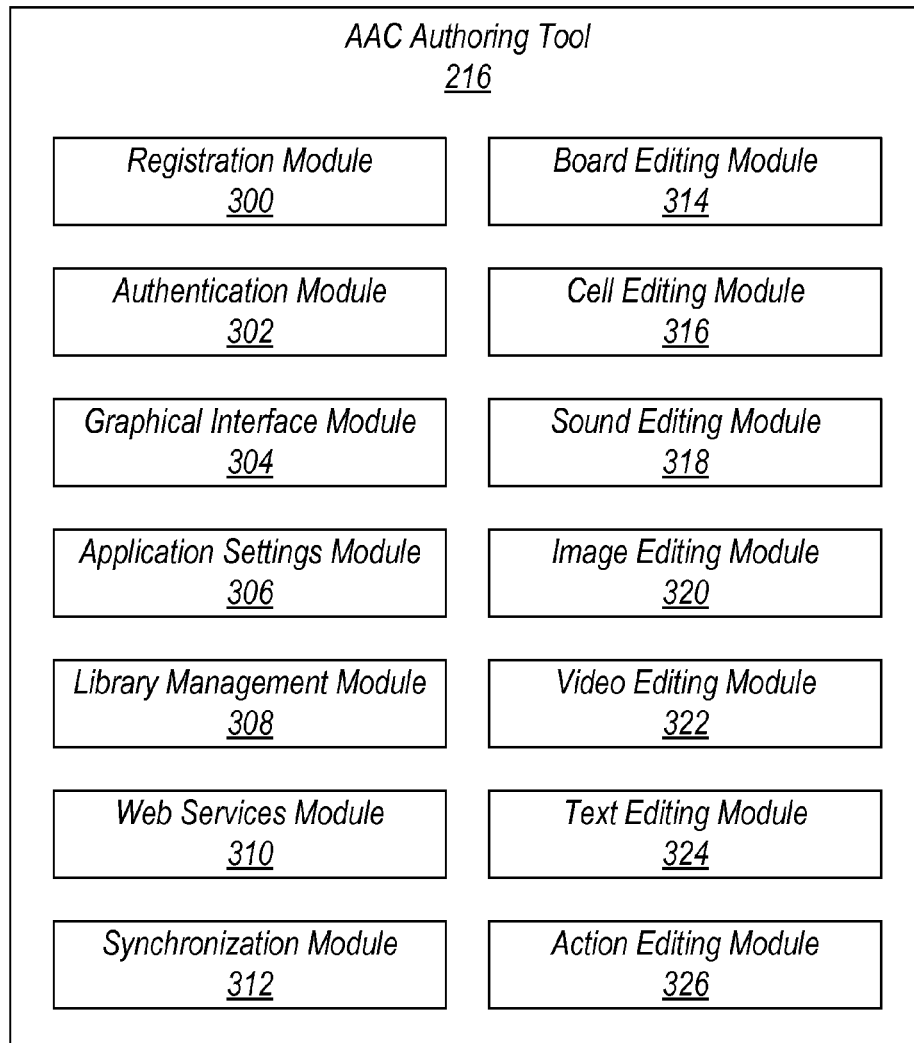
FIG. 3 illustrates an exemplary Web-based authoring tool in accordance with the systems and methods of the present disclosure.

Referring to FIG. 3, in one implementation, the Web-based AAC authoring tool 216 may comprise a number of functional components, shown here as discrete modules. Of course, those having ordinary skill in the art will understand that throughout this disclosure, two or more functional components may be combined into a single component, and that any individual functional component may be divided into several constituent components, without departing from the disclosed embodiments. These functional components may operate in conjunction with one another, each module being able to invoke and transfer data to and from one or more other modules as needed to provide the overall functionality and look-and-feel of the AAC authoring tool 216.

As can be seen in the present implementation, the functional components of the AAC authoring tool 216 may include a registration module 300 for registering and creating an account for a new AAC Author, and an authentication module 302 for verifying the login credentials (created during registration) of the AAC Author before allowing him to access and use the AAC authoring tool 216. Such login credentials (e.g., user name, password, etc.), along with basic information about the AAC Author, account information, any usage or activity tracking information, and any other information about the AAC Author may be stored in the database 110. The AAC authoring tool 216 may additionally comprise a graphical interface module 304 for displaying icons and other visual indicators that allow the AAC Author to view, provide input (e.g., mouse clicks, keystrokes, etc.), and otherwise interact with the AAC authoring tool 216. An application settings module 306 allows the AAC Author to adjust and configure the graphical interface and other aspects of the AAC authoring tool 216 as desired. The AAC authoring tool 216 may also comprise a library management module 310 for allowing the AAC Author to manage (e.g., add, move, delete, rename, etc.) various expressive content files (e.g., images, audio, video, etc.) that are stored with the AAC authoring tool 216 on the Web server 108. The AAC authoring tool 216 may further comprise a Web services module 310 for handling the receipt and transport of data to and from the ACC authoring tool 216 and the personal computer 104 used by the AAC Author.

Also present in the current implementation of the AAC authoring tool 216 is a synchronization module 312 for allowing expressive content as well as content selection interfaces created and/or modified by the AAC Author to be synchronized between the wireless handheld multimedia device 102a or 102b for a given AAC User and the Web server 108. Such synchronization is generally well known in the art, as reflected by U.S. Pat. No. 7,680,849 ("Multiple Media Type Synchronization between Host Computer and Media Device) and U.S. Pat. No. 7,660,831 ("Synchronization Methods and Systems"), both of which are incorporated herein by reference.

In general, when an AAC User activates the synchronization function on his wireless handheld multimedia device 102a or 102b, the synchronization module 312 looks and compares the set of expressive content stored on the handheld device 102a or 102b to the set of expressive content stored on the Web server 108 for that AAC User. If there is expressive content on the handheld device 102a or 102b that is not on the Web server 108, or if there is more recent expressive content on a handheld device 102a or 102b than on the Web server 108, then the synchronization module 312 uploads those files to the account of the AAC User, and vice versa. A similar synchronization may also occur when there is a newer content selection interface on the handheld device 102a or 102b of the AAC User than on the Web server 108, and vice versa. It may be desirable, however, to restrict the direction of synchronization in some cases, depending on what is being synchronized. For example, it may be advisable to allow newly created boards to be synchronized from the Web server 108 down to the handheld devices 102a and 102b, but not vice versa, yet allow changes to existing boards to be synchronized in both directions.

Other functional components in the AAC authoring tool 216 may include a board editing module 314 and a cell editing module 316 for allowing the AAC Author to create and personalize boards and cells. A sound editing module 318, image editing module 320, video editing module 322, and text editing module 324 are also present for allowing the respective content types to be added to and associated with the cell, whereas an action editing module 326 allows a board to be associated with the cell. These various modules 314-326 allows the AAC Author to add personalized expressive content to the content selection interface on the wireless handheld multimedia devices 102a or 102b, including personalized images, sounds, text, videos, and the like from a personal repository, from family members and others, from the Web, by creating, recording, or otherwise capturing the expressive content on the spot, and so forth.

Figure 4:
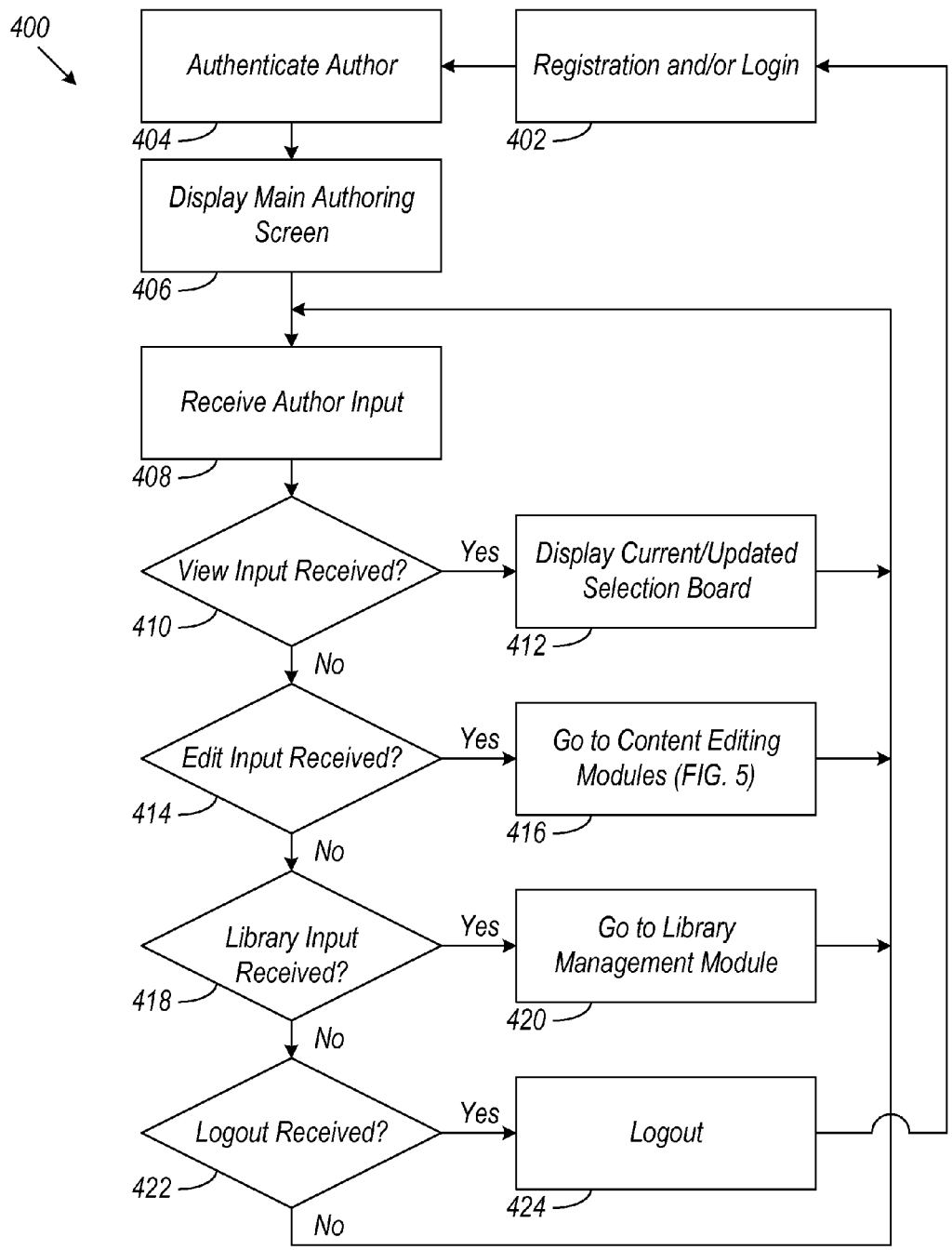
FIG. 4 illustrates an exemplary flowchart for the Web-based authoring tool in accordance with the systems and methods of the present disclosure.

Operation of the Web-based AAC authoring tool 216 is illustrated generally in FIG. 4 via a flowchart 400, which shows an exemplary method of adding personalized expressive content and customizing the content selection interface. Note that, as with FIG. 3, although the steps of the method are shown in discrete blocks here, those having ordinary skill in the art will understand that, throughout this disclosure, two or more blocks may be combined into a single block, and that any individual block may be divided into several constituent blocks, without departing from the disclosed embodiments. In addition, although the blocks of the flowchart 400 have been arranged in a particular sequence, those having ordinary skill in the art will understand that, throughout this disclosure, one or more blocks may be rearranged in a different sequence without departing from the scope of the disclosed embodiments.

As can be seen, the method begins at block 402 where the AAC Author is given the opportunity either to register a new account if he does not already have one or if he wishes to establish another account (i.e., the AAC Author is supporting multiple individuals), or to log in by entering his credentials. At block 404, the AAC Author is authenticated and allowed to access the AAC authoring tool 216, whereupon he is presented with a main authoring screen at block 406. The AAC Author's input is then received and processed at block 408. At block 410, a determination is made as to whether the input received from the AAC Author invokes a view function and, if yes, the current display screen is updated with any new changes at block 412. If no, then a determination is made at block 414 as to whether the input received from the AAC Author invokes an edit function and, if yes, the flowchart 400 proceeds to block 416 where the appropriate editing modules are initiated, as discussed below in connection with FIG. 5. If no, then at block 418, a determination is made as to whether the input from the AAC Author invokes the library management function and, if yes, the flowchart 400 proceeds to block 420 where the library management module is initiated. If no, then at block 422, a determination is made as to whether the input from the AAC Author invokes a logout function and, if yes, the AAC Author is logged out at block 424, and the flowchart 400 returns to the registration and login block 402. If no, then the flowchart 400 returns to block 408 to await the next input from the AAC Author.

Figure 5:
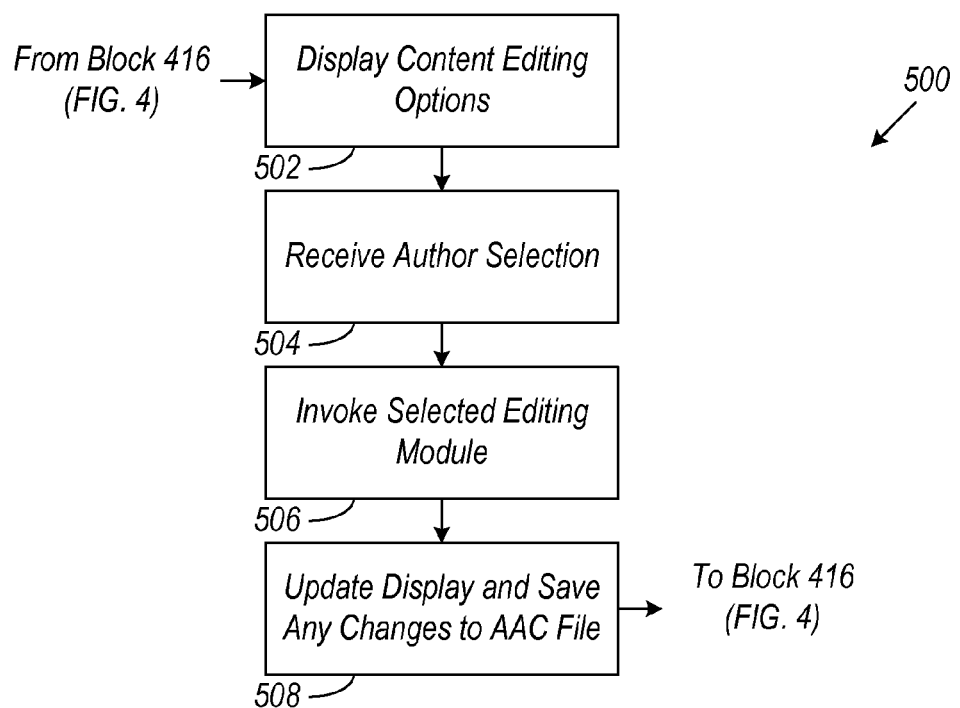
FIG. 5 illustrates another exemplary flowchart for the Web-based authoring tool in accordance with the systems and methods of the present disclosure.

FIG. 5 illustrates the editing function of the Web-based AAC authoring tool 216 in more detail via a flowchart 500. Once editing is entered at block 416, a plurality of editing options are displayed to the AAC Author at block 502. In the current implementation, these editing options may include options for adding/changing boards and cells and the sounds, images, videos, text, and other expressive content associated with these boards and cells. At block 504, the editing option selected by the AAC Author is received, and the appropriate editing module (e.g., boards, cells, sounds, images, video, or text module) is thereafter invoked at block 506. After the selected editing module has completed, the flowchart 500 proceeds to block 508 where the display screen is refreshed to display any updates to the expressive content and/or content selection interface. The flowchart 500 thereafter returns to block 416 (see FIG. 4) to continue with other authoring tasks that the AAC Author may wish to perform.

Figure 6A:
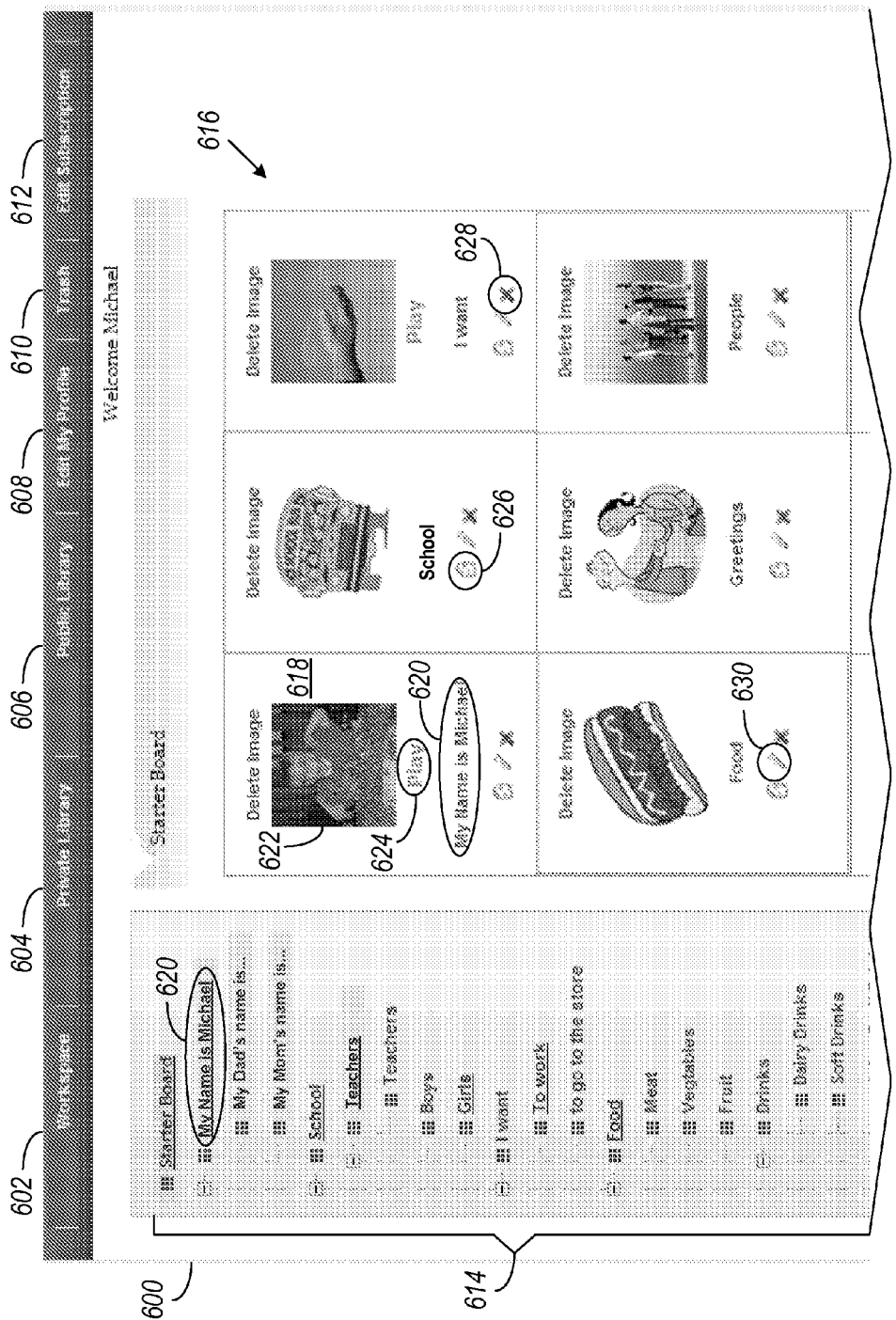
FIGS. 6A-6I illustrate an exemplary graphical interface Web-based authoring tool in accordance with the present disclosure.

FIGS. 6A-6I illustrates an exemplary graphical interface that reflects the methods discussed above for the Web-based AAC authoring tool 216. For purposes of economy of the description, only some of the exemplary capabilities of the graphical interface are described. It is expected, however, that those having ordinary skill in the art will readily recognize that numerous additional capabilities and functions of the graphical interface exist from the description of the ones shown here. In general, the exemplary graphical interface allows the AAC Author to create personalized expressive content for one of the AAC Users A or B, and to customize content selection interfaces for that user. Such a graphical interface may be presented to the AAC Author upon going to the URL of the Web-based AAC authoring tool 216 from a Web browser and successfully completing the login procedure therefor. As can be seen in FIG. 6A, upon accessing the AAC authoring tool 216, the AAC Author may be presented with a main screen 600 having a plurality of tabs across the top. These tabs may include a Workspace tab 602 where most authoring tasks may be performed, a Private Library tab 604 where personal expressive content files may be uploaded and stored, a Public Library tab 606 where expressive content available all users of the AAC authoring tool 216 may be found, an Edit My Profile tab 608 where the AAC Author may edit his personal information, a Trash tab 610 where previously deleted expressive content and/or content selection interfaces may be recovered, and an Edit Subscription tab 612 where the AAC Author may modify his account with the Web-based AAC authoring tool service. A navigation tree 614 is displayed on the left side of the main screen 600 for listing the various boards and cells that make up the content selection interface in the current account.

On the right side of the main screen 600 is a board 616 containing nine cells arranged in an array of three rows and three columns, one of which is indicated at 618 for reference. This particular cell 618 has been named "My Name is Michael," as indicated by reference numeral 620 both within the cell and at the top of the navigation tree, and has an image 622 and an audio file associated therewith. Clicking on the word "play" indicated by reference numeral 624 underneath the image 622 allows the AAC Author to listen to the playback of the audio file. Each cell also has several editing icons associated therewith, including a copy icon 626 for copying the cell, a cancel icon 628 for removing all content associated with the cell, and an edit icon 630 for adding or changing content associated with the cell. Note that not all of the cells are visible in FIG. 6A due to page size limitations. The board 616 has been named "Starter Board" in the present implementation, but it may or may not have a name in other implementations, depending on the particular requirements. In general, for nested boards, the name of the board is the same as the name of the cell to which the board is associated.

Figure 6B:
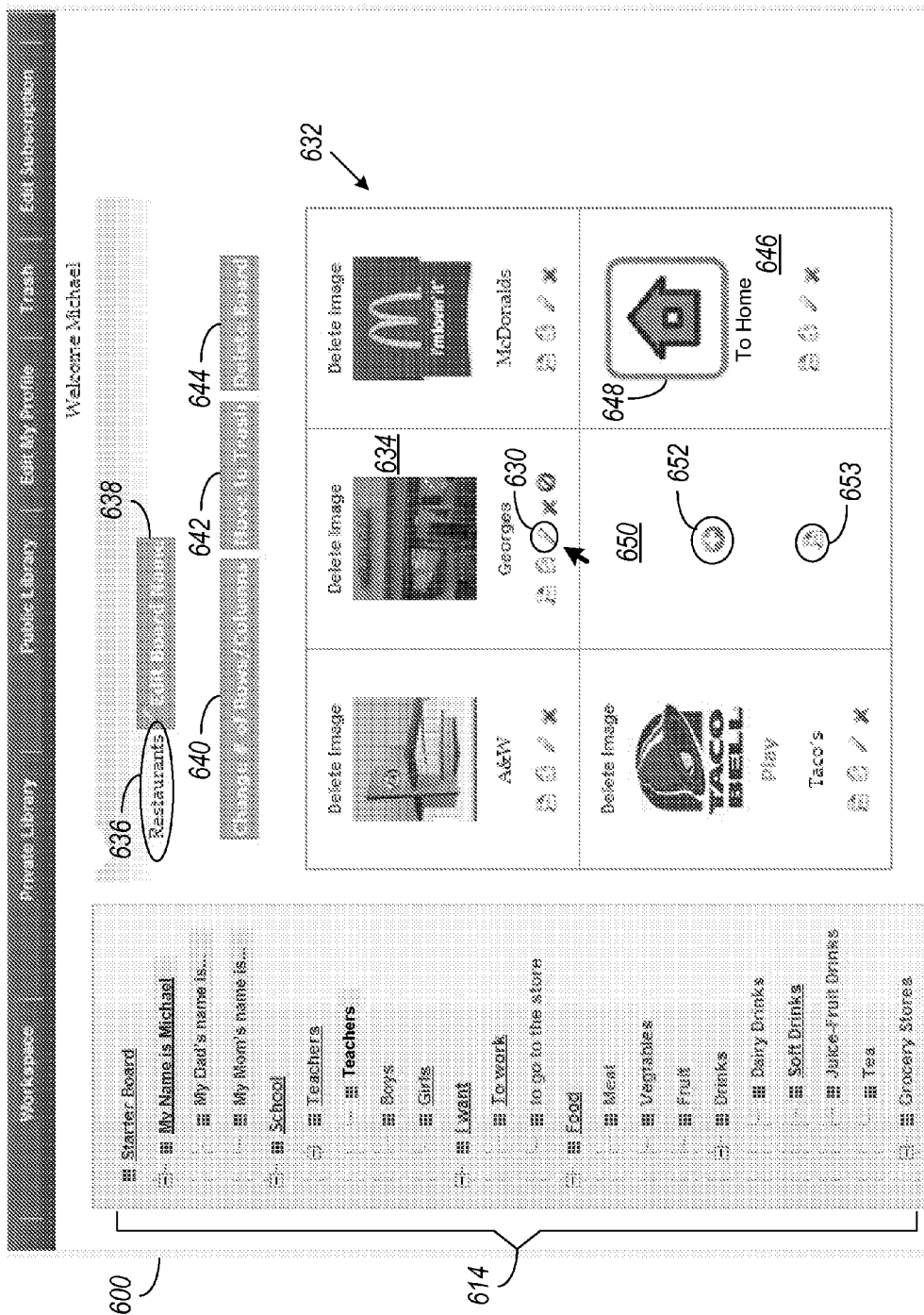

Clicking on the name of a cell that has a board associated therewith allows the AAC Author to edit the board, as illustrated in FIG. 6B. In the example shown, the AAC Author has clicked on the name "Restaurant" in one of the cells, as indicated at 636. This particular cell resides in one of the boards further down the navigation tree 614 and is therefore not currently visible. The clicking on the cell name causes the "Restaurant" board 632, which has six cells, one of which is named "Georges," labeled here as 634 for reference, to be displayed in board editing mode. By default, the six cells are arranged in two rows and three columns, but the AAC Author may select any numerically possible arrangement of rows and columns without departing from the scope of the disclosed embodiments. A number of board editing options are also presented at this time, including an Edit Board Name button 638 for changing the name of the board, a Change # of Rows/Columns button 640 for changing the number of cells and/or arrangement of the cells, a Move to Trash button 642 for deleting the board with subsequent recovery capability, and a Delete Board button 644 for permanently deleting the board.

The "Restaurant" board 632 also includes a navigation cell 646 called "To Home," depicted here using an image of a house 648. The navigation cell 646 is a pre-programmed cell that, when pressed or selected on the wireless handheld multimedia device 102a or 102b, conveniently returns the AAC User to the top of the navigation tree 614 (i.e., the Starter Board). Also shown in the "Restaurant" board 632 is an empty cell 650 that does not currently have expressive content or a board associated therewith. The AAC Author may add expressive content and/or a board to the empty cell 650 by clicking on an add content icon 652. It is also possible to paste the expressive content and/or board associations from an existing cell into the empty cell 650 by clicking on a paste icon 653 (after having previously clicked on the copy icon 626 for the existing cell).

Figure 6C:
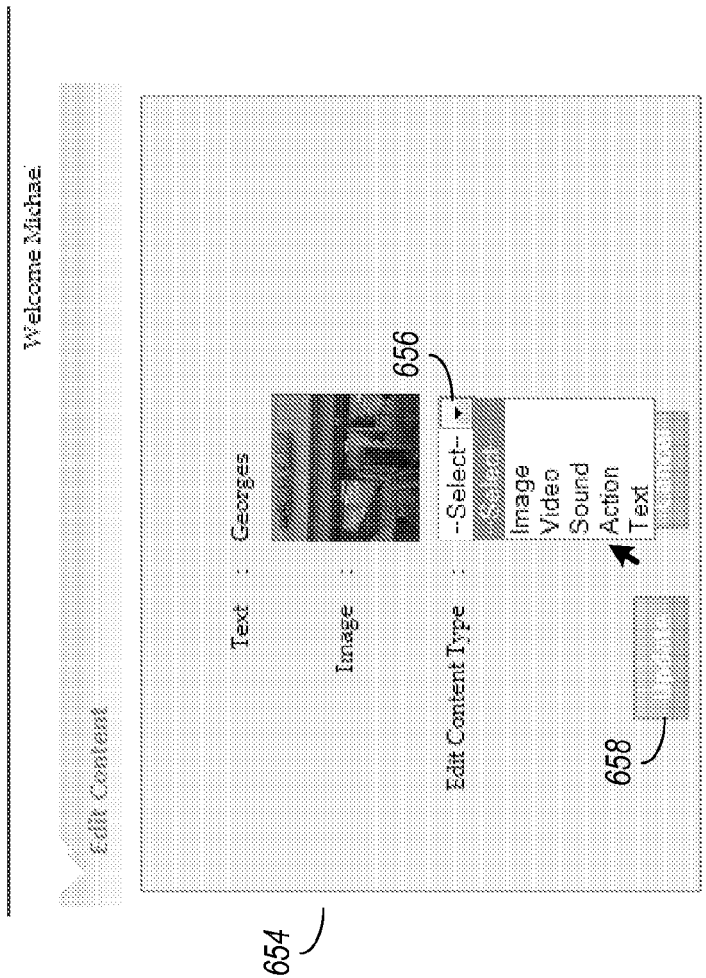

Clicking on the edit icon 630 in a cell allows the AAC Author to edit the cell, as illustrated in FIG. 6C. In this example, the AAC Author has clicked on the edit icon 630 for the cell 634 named "Georges," which is depicted with a picture of a Coney Island restaurant (apparently, George likes Coney Island). This action brings up an Edit Content screen 654 containing, among other things, an Edit Content Type drop-down list 656 for allowing the AAC Author to choose the type of expressive content to add to the cell. Here, the content type in the drop-down list 656 includes "Image," "Video," "Sound," and "Text" for editing, respectively, any images, videos, sounds, and text associated with the "Georges" cell 634. Clicking on an Update button 658 causes the changes made to the cell 634 by the AAC Author to be saved on the Web server 108 in real time, or substantially real time.

Figure 6D:
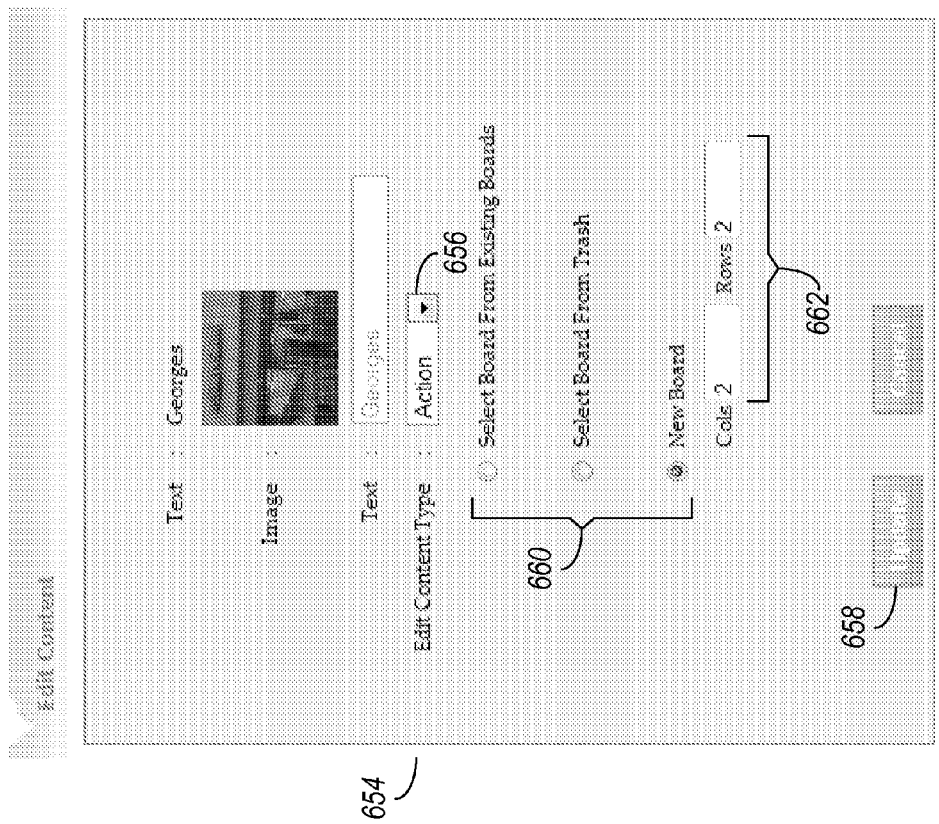

The drop-down list 656 may also include an "Action" option in some embodiments for allowing the AAC Author to edit any board that may be associated with the cell 634, as illustrated in FIG. 6D. Choosing "Action" from drop-down list 656 brings up a series of radio buttons 660 representing various board editing options from which the AAC Author may select. These options include using one of the existing boards (top radio button), using a previously deleted board (middle radio button), and creating a new board (bottom radio button). Selecting the latter brings up configuration fields 662 for allowing the AAC Author to define the number of rows and columns in the board. Again, clicking on the Update button 658 causes the changes made to the cell 634 to be saved on the Web server 108.

Figure 6E:
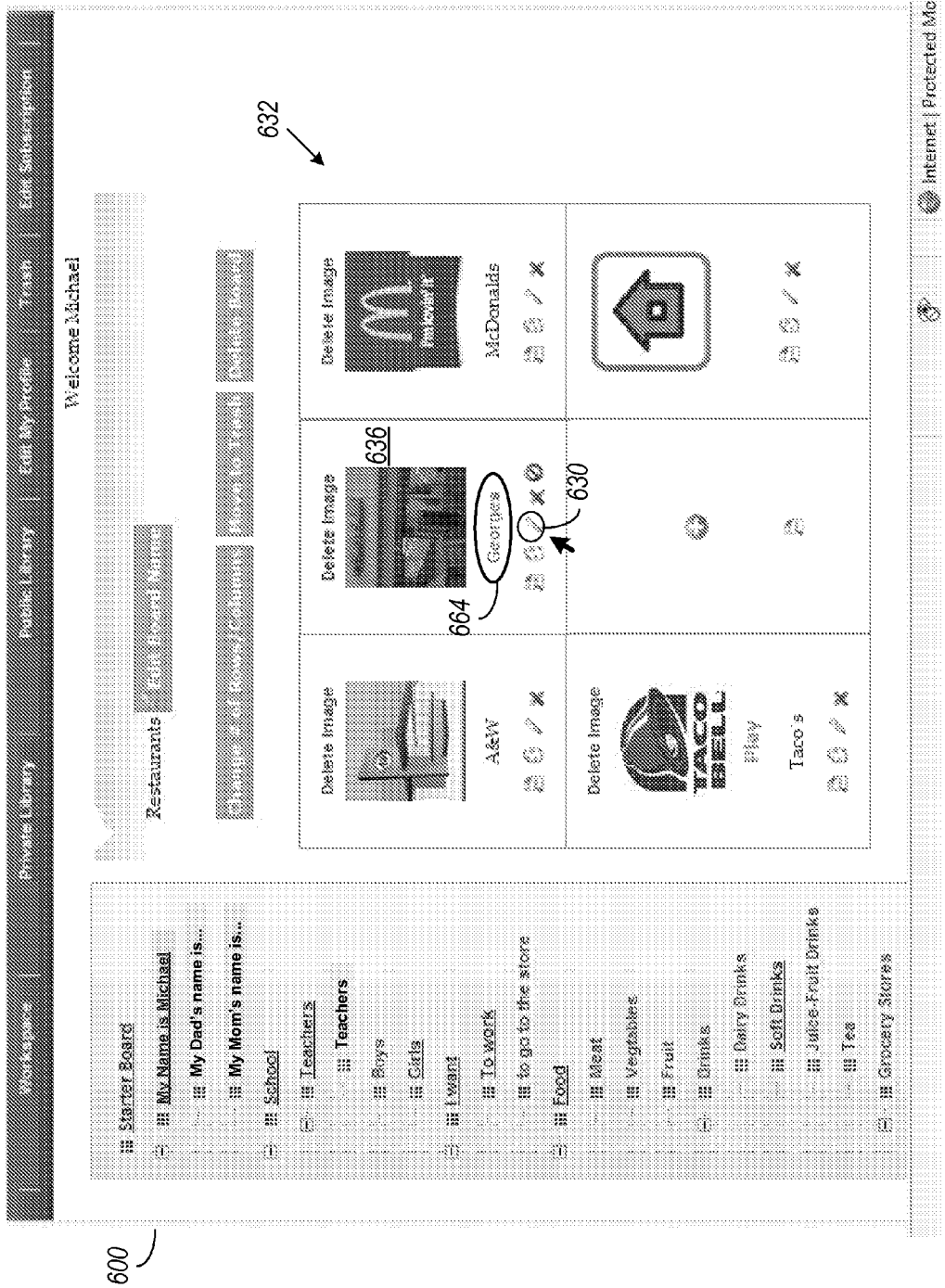

In some embodiments, the addition of a board to a cell may be denoted by, for example, displaying a different color font, underlining, and/or bolding for the name of the cell to make the cell stand out from other cells that do not have a board associated therewith. This is illustrated in FIG. 6E at reference numeral 664 for the recently edited "Georges" cell 634 (which now as a board associated therewith).

Figure 6F:
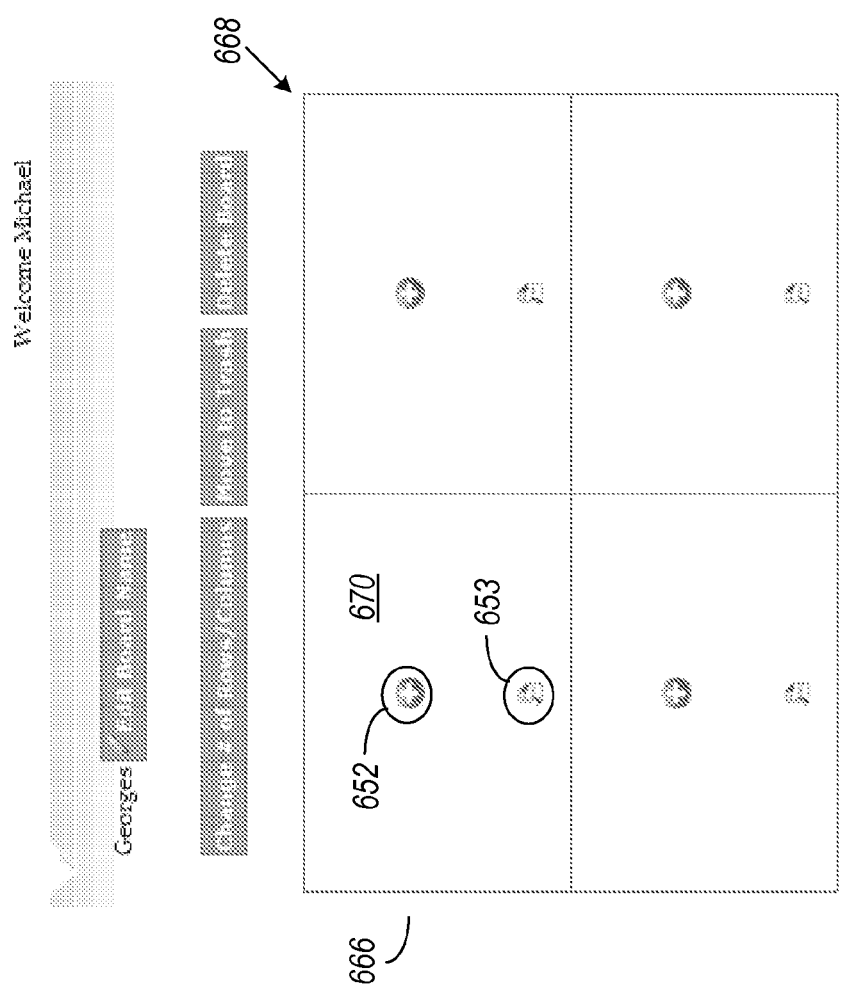

Clicking on the edit icon 630 in a cell that has a board associated therewith allows the various aspects of the board to be edited. This is illustrated in FIG. 6F, where clicking on the edit icon 630 in the "Georges" cell 634 has brought up a board editing screen 666 containing the newly added board 668. As can be seen, the newly added board 668 has four empty cells, one of which is labeled 670 for reference, each cell containing an add content icon 652 and a paste icon 653.

Figure 6G:
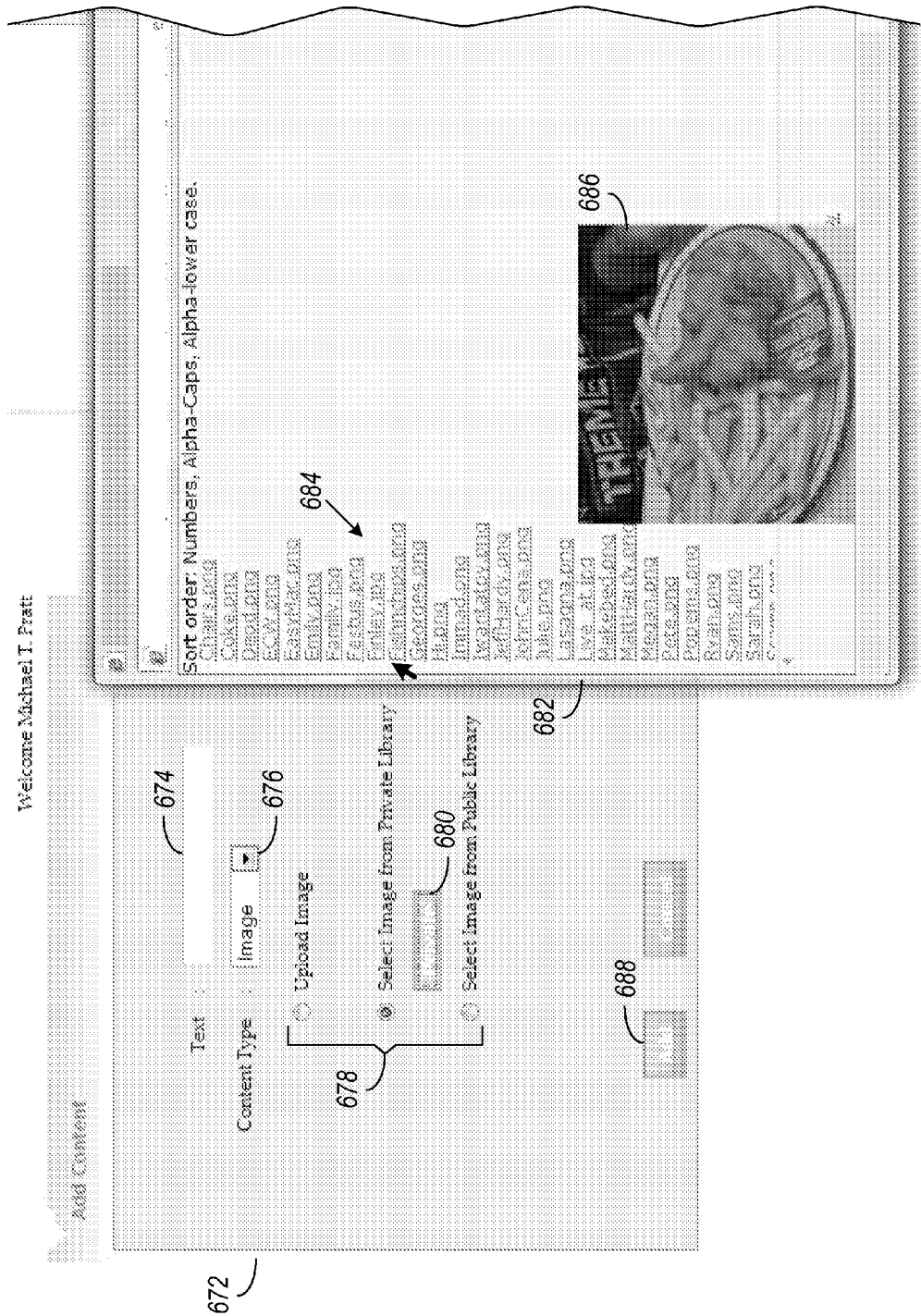
Figure 6H:
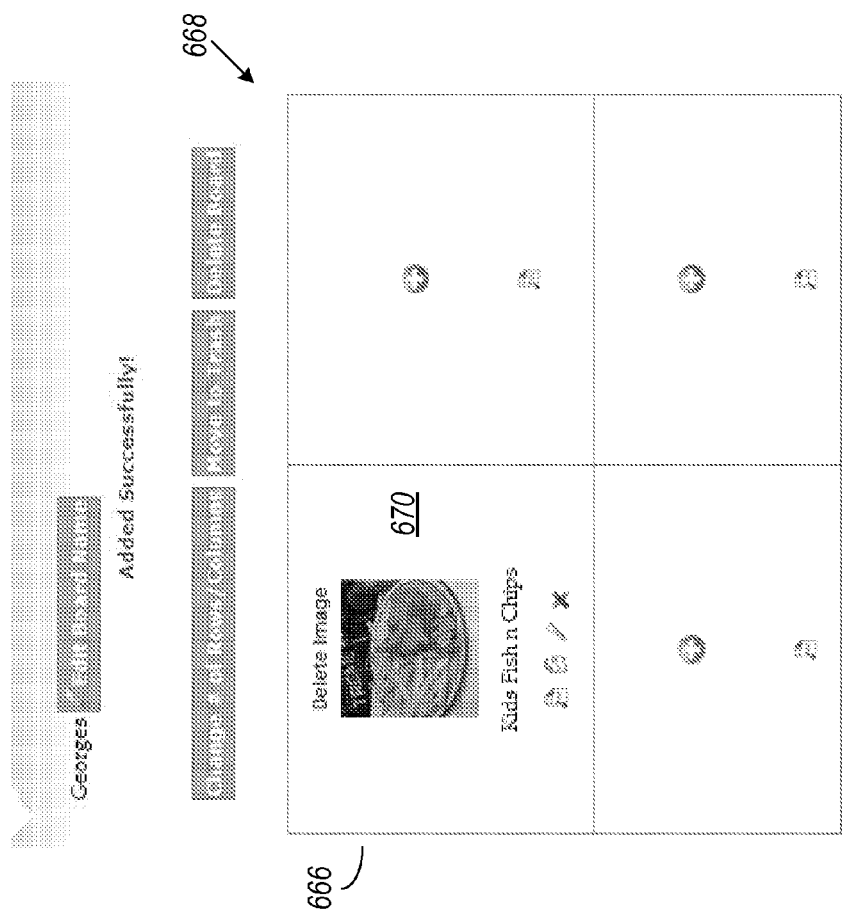

Clicking on the add content icon 652 for the cell 670 brings up an Add Content screen 674, as illustrated in FIG. 6G. The Add Content screen 672 may include a Text field 674 for entering the name of the cell and a Content Type drop-down list 676 for selecting the type of expressive content to be used with the cell. Here, the AAC Author has selected an image content type, which brings up several radio buttons 678 representing various options for adding an image from which the AAC Author may select. These options include, for example, uploading the image from AAC Author's personal computer 104 (top radio button), selecting the image from his private collection of images (middle radio button), and selecting the image from the public collection (bottom radio button). Selecting the middle option brings up a Private button 680 that the AAC Author can click to launch a new window 682 containing a list 684 of his private image files. In some embodiments, hovering the mouse cursor over the filename of one of the image files brings up a box containing the image 686 for that image file. The AAC Author may thereafter click on the file name for the image file to choose that image. Clicking on an Add button 688 allows the AAC Author to update the empty cell 670 with the selected image, as illustrated in FIG. 6H.

Figure 6I:
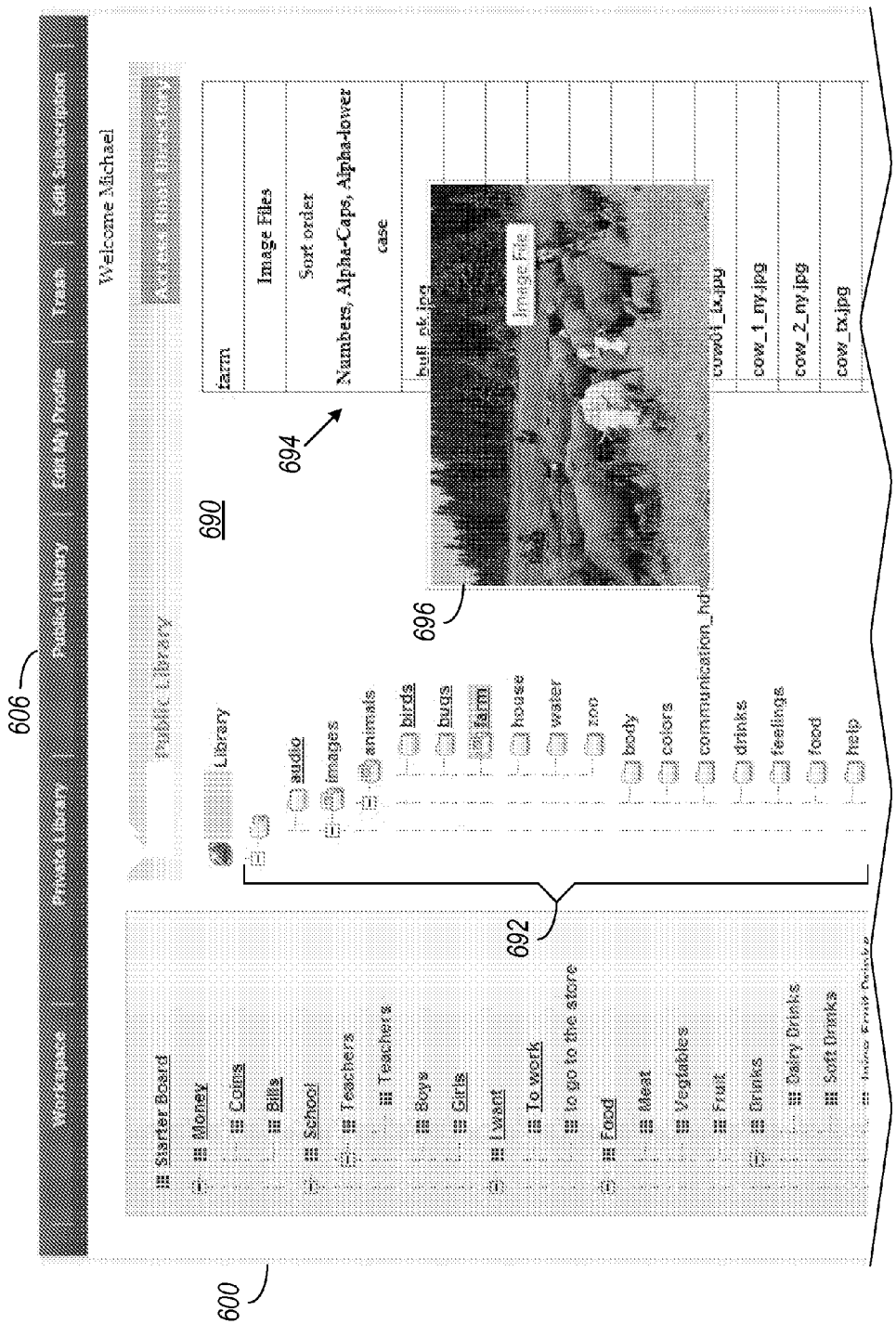

FIG. 6I illustrates an example of the main screen 600 with the Public Library tab 606 selected. Selecting this tab 606 brings up a public library 690 of expressive content on the main screen 600. The expressive content in this public Library 690 are arranged in folders and subfolders, each folder and subfolder being named and organized in a manner to logically convey the content of the folder. A folder tree 692 allows the AAC Author to navigate and choose one of the folders, the contents of which are then listed in a user-sortable list 694. In some embodiments, hovering the mouse cursor over an image file launches a pop-up box 696 containing the image for that image file. Selecting and navigating the private library may be accomplished in a similar manner as the public library and will therefore not be described in detail here.

Figure 7A:
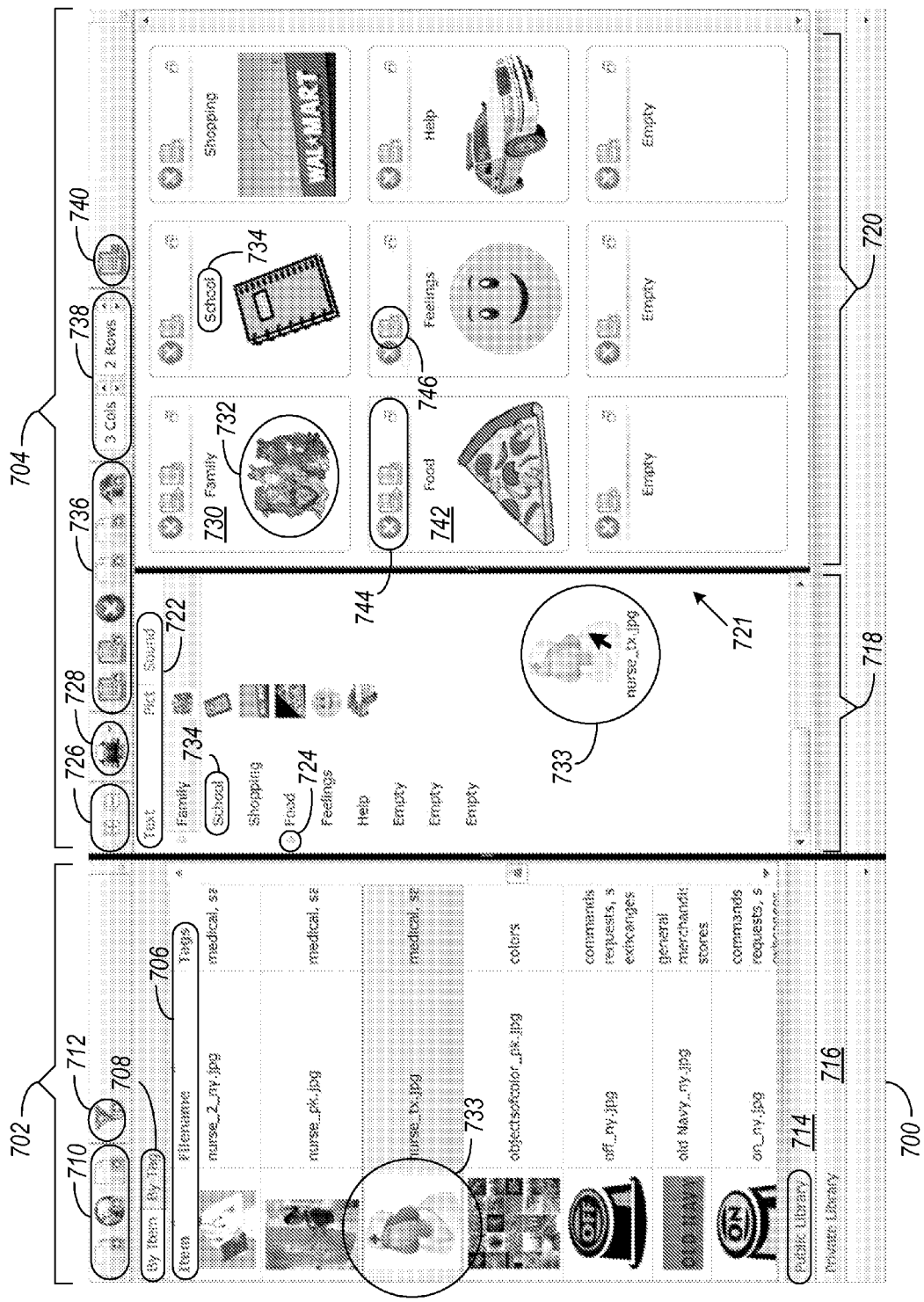
FIGS. 7A-7E illustrate another exemplary graphical interface Web-based authoring tool in accordance with the present disclosure.

Referring now to FIGS. 7A-7E, an alternative exemplary graphical interface for the Web-based AAC authoring tool 216 is shown for allowing the AAC Author to create personalized expressive content and customize content selection interfaces. As with the previous graphical interface, only some of the capabilities of this graphical interface will be described for purposes of economy of the description. The exemplary graphical interface makes extensive use of the drag-and-drop capability of existing computer operating systems, such as the most recent version of Mac OS and Windows. As can be seen in FIG. 7A, upon accessing the AAC authoring tool 216, the AAC Author may be presented with a main screen 700. The main screen 700 is generally divided into two interrelated sections, an expressive content library 702 and a workspace 704. The expressive content library 702 allows the AAC Author to store and/or select various types of expressive content to be used in the content selection interfaces, and the workspace 704 allows the AAC Author to add, edit, and remove expressive content for boards and cells and otherwise modify a content selection interface.

With respect to the expressive content library 702, information for each item of expressive content may be displayed in three user-sortable columns, shown by the column headings at reference numeral 706. For example, there may be an Item column for showing a picture of the item, a Filename column for showing the filename of the item, and a Tags column for showing various key words and terms that may be associated with the item for searching purposes. For the Item column, if the item is an image file, then the image itself (or a reduced version thereof) may be displayed in the column. On the other hand, if the item is an audio or video file, then an icon representing an audio file (e.g., an audio speaker) or video file (e.g., a reel of film) may be displayed. A plurality of sort tabs 708 displayed above the columns headings 706 allow the information to be sorted by one or more criteria, such as by item names (or filenames) or by the tags associated with the items. A plurality of content management icons 710 at the top of the content library section allow the AAC Author to add or remove items of expressive content from the content library 702. In the example shown, there is an add content icon (leftmost) for adding content from the AAC Author's personal computer 104, a Web content icon (middle) for adding content from the Web, and a delete icon (rightmost) for deleting content from the library. A filter icon 712 allows the AAC Author to display only the contents of the library 702 meeting one or more criteria, such as specific tags, and the like. A Public Library tab 714 and Private Library tab 716 allow the AAC Author to choose between public expressive content and his private expressive content as needed.

As for the workspace 704, this section of the main screen 700 is generally divided into a navigation panel 718 and a board panel 720. The navigation panel 718, which displays the various boards and cells that form the current content selection interface, may in turn be arranged into a plurality of areas, indicated by the area headings at reference numeral 722. For example, there may be a Text area for the names of boards and cells, a Picture area for any images associated with the boards and cells, and a Sound area for any audio files associated with the boards and cells. Expansion icons 724 may appear in the Text area adjacent the names of boards that have one or more boards nested therein, such as the "Family" board and the "Food" board in the present example. Global expansion icons 726 may be provided above the area headings 722 for viewing all of the boards in expanded or collapsed form. A print icon 728 next to the expansion icons 726 provides printing functionality for the main screen 700.

Selecting a board in the navigation panel 718 causes the cells (or cell) of that board to be displayed in the board panel 720. If a selected board only has one cell (i.e., the board is the cell), then the board panel 720 simply displays other boards and cells that are on the same level in the navigation panel 718 as the selected board. In the example of FIG. 7A, the board panel 720 illustrates a top level or main board 721, which is the level equivalent of the "Starter Board" in FIG. 6A, except that there is no specific name associated with the main board 721. There are nine boards and cells in the main board 721, shown here in a three-by-three array composed of two boards, a "Family" board 730 and a "Food" board 742, four cells that have expressive content but no nested boards ("School," "Shopping," "Feelings," and "Help"), and three empty cells (bottom row) with no boards or expressive content.

Each board or cell that has an image associated therewith is depicted using that image (see image labeled 732 for the "Family" cell 730). The images for a board or a cell may be added or replaced simply by dragging one of the images from the library section 702 to the board panel 720 and dropping the image in the desired board or cell. As an example, an image 733 of a nurse is currently being dragged and dropped from the library section 702 to the board panel 720. These images may then appear in their respective board or cell in the board panel 720, as well as next to the name of their respective board or cell in the Picture area of the navigation panel 718. Similarly, each board or cell that has a name associated therewith may also be depicted using that name, with the name then appearing in the Text area of the navigation panel 718 accordingly (see "School" at 734). Any name in any board or cell may be edited simply by clicking on the name and typing in the changes.

A plurality of board and cell management icons, referenced generally at 736, is displayed next to the print icon 728 for allowing the AAC Author to manage the various boards and cells. For example, starting from the leftmost position, there may be an add board icon for adding new boards to the content selection interface, a delete board icon for removing existing boards, a cancel icon for clearing (not deleting) any image, sound, or text that may be associated with a board or cell, an add cell icon for adding new cells, a delete cell icon for removing existing cells, and a home icon for adding a special type of navigation cell called "To Home" that, when pressed or selected on the wireless handheld multimedia device 102a or 102b, conveniently returns the AAC User directly to the board at the top of the navigation panel 718. A plurality of board configuration fields 738, including a number of columns field and a number of rows field, allow the AAC Author to specify the number of rows and columns to be displayed for a board (within the permissible number of rows and columns). Finally, a back icon 740 conveniently takes the AAC Author back to the previously displayed board.

Other board and cell management icons, referenced generally at 744, may be provided directly on each board or cell in the board panel 720. For example, referring to the "Food" board 742 and starting with the leftmost icon, there may be a cancel icon for removing any image, sound, or text associated with the cell, a child board icon for navigating to any boards that may be associated with the cell (e.g., a nested board), a delete child board icon for deleting any boards associated with the cell, and a minimize icon that reduces or minimizes the depiction of all other boards and cells in the board panel 720 except the current cell, which is enlarged. If the cell does not have a child board associated therewith, then an add board icon 746 may be displayed on the cell for allowing the AAC Author to add a board to the cell.

Figure 7B:
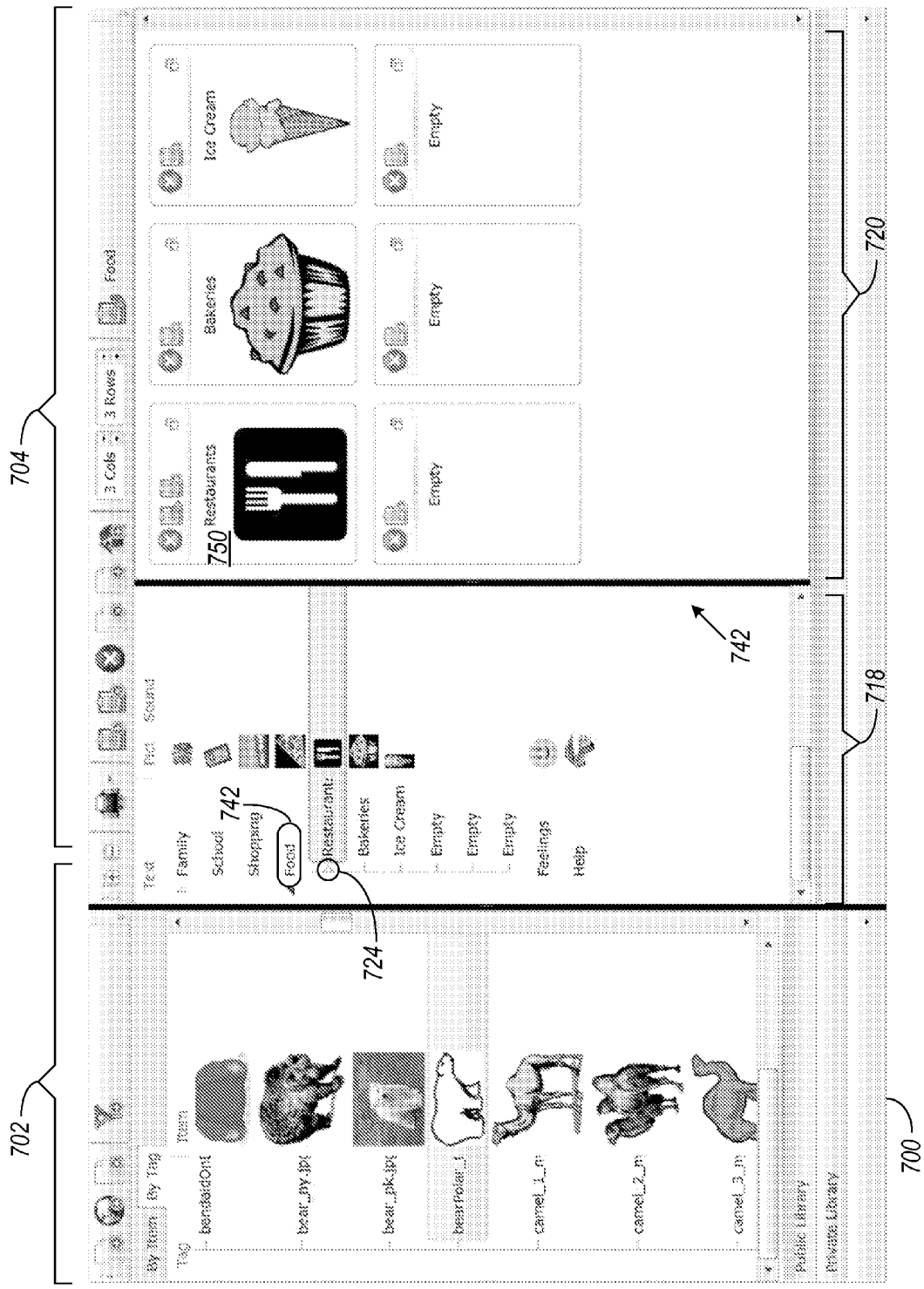
Figure 7C:
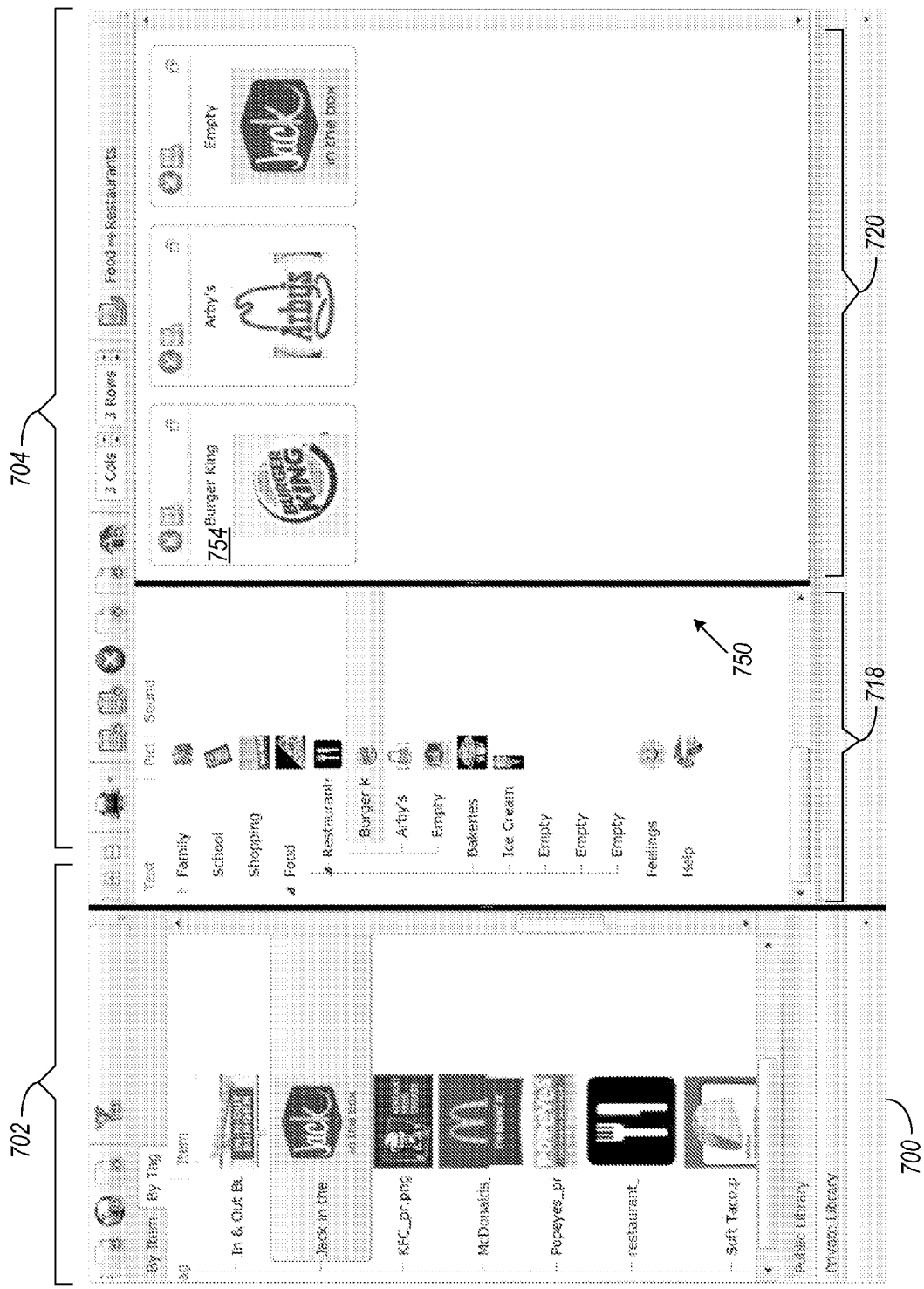

Turning now to FIG. 7B, the "Food" board 742 has now been selected in the navigation panel 718, revealing a plurality of boards and cells therefor, including a "Restaurant" board 750. An expansion icon 724 may be seen next to the "Restaurant" board 750, indicating that this board has another board associated therewith. Clicking on the expansion icon 724 for the "Restaurant" board 750 brings up another set of cells for that board, one of which is labeled 754 ("Burger King") for illustrative purposes, as can be seen in FIG. 7C.

Figure 7D:
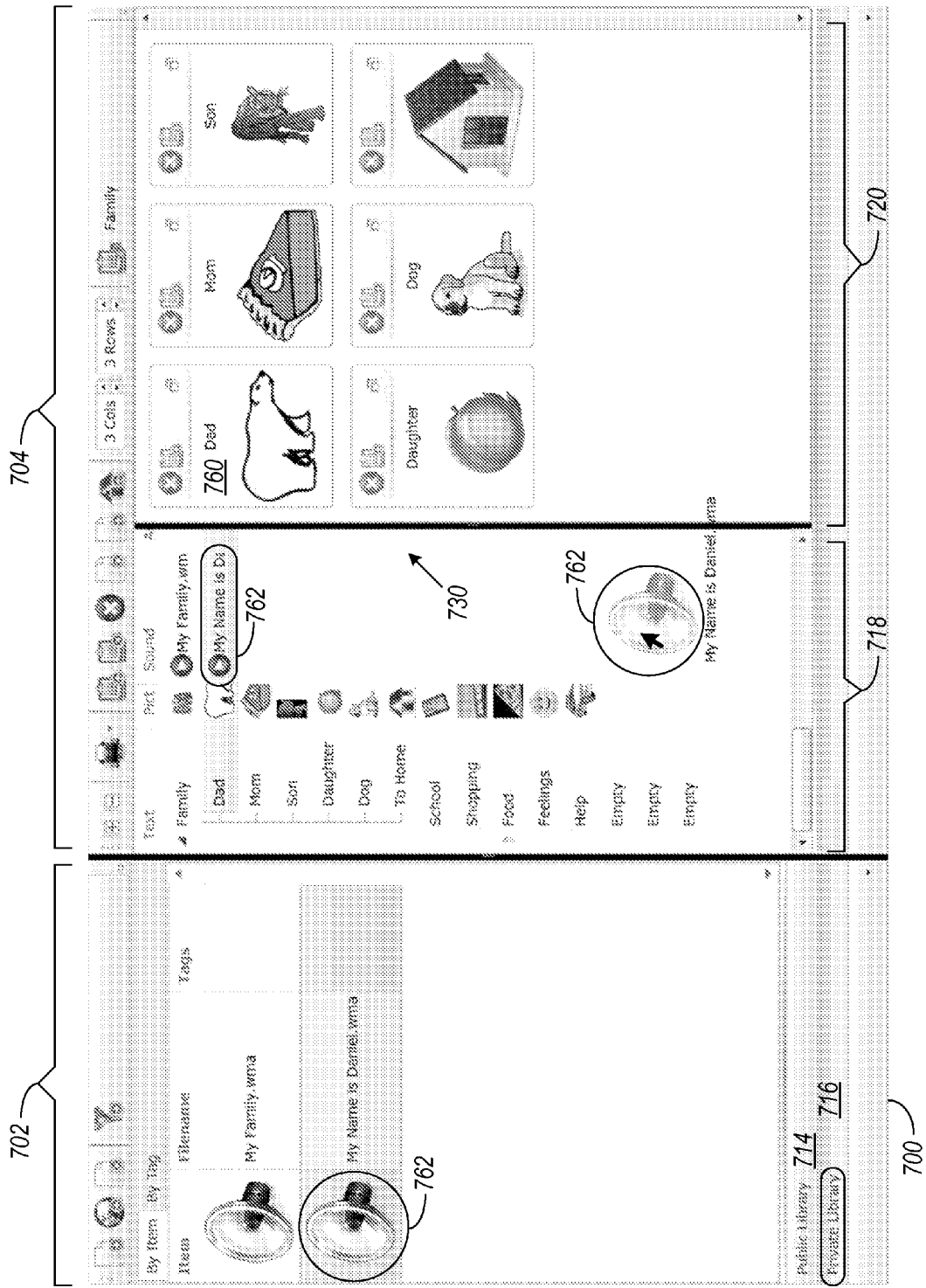

FIG. 7D shows an example of sound content being added to a cell. In this example, the "Family" board 730 has been selected in the navigation panel 718, causing the cells therein, one of which is labeled 760 ("Dad") for illustrative purposes, to be displayed in the board panel 720. Sound content may be added to this cell 760 by dragging an audio file 762 from the library section 702 and dropping the file into the desired cell 760 in the board panel 720, as shown. Here, the audio file 762 is being retrieved from the AAC Author's private library (Private Library tab 716) as opposed to the public library. When the cell 760 is subsequently selected or pressed by an AAC User on his wireless handheld multimedia device 102a or 102b, the newly added sound will be played back on the speakers of the device. The foregoing procedure may be used to add sound to a board as well. Note that the audio file 762 is depicted in the library section 702 using a speaker icon to indicate that the file is a sound file.

Figure 7E:
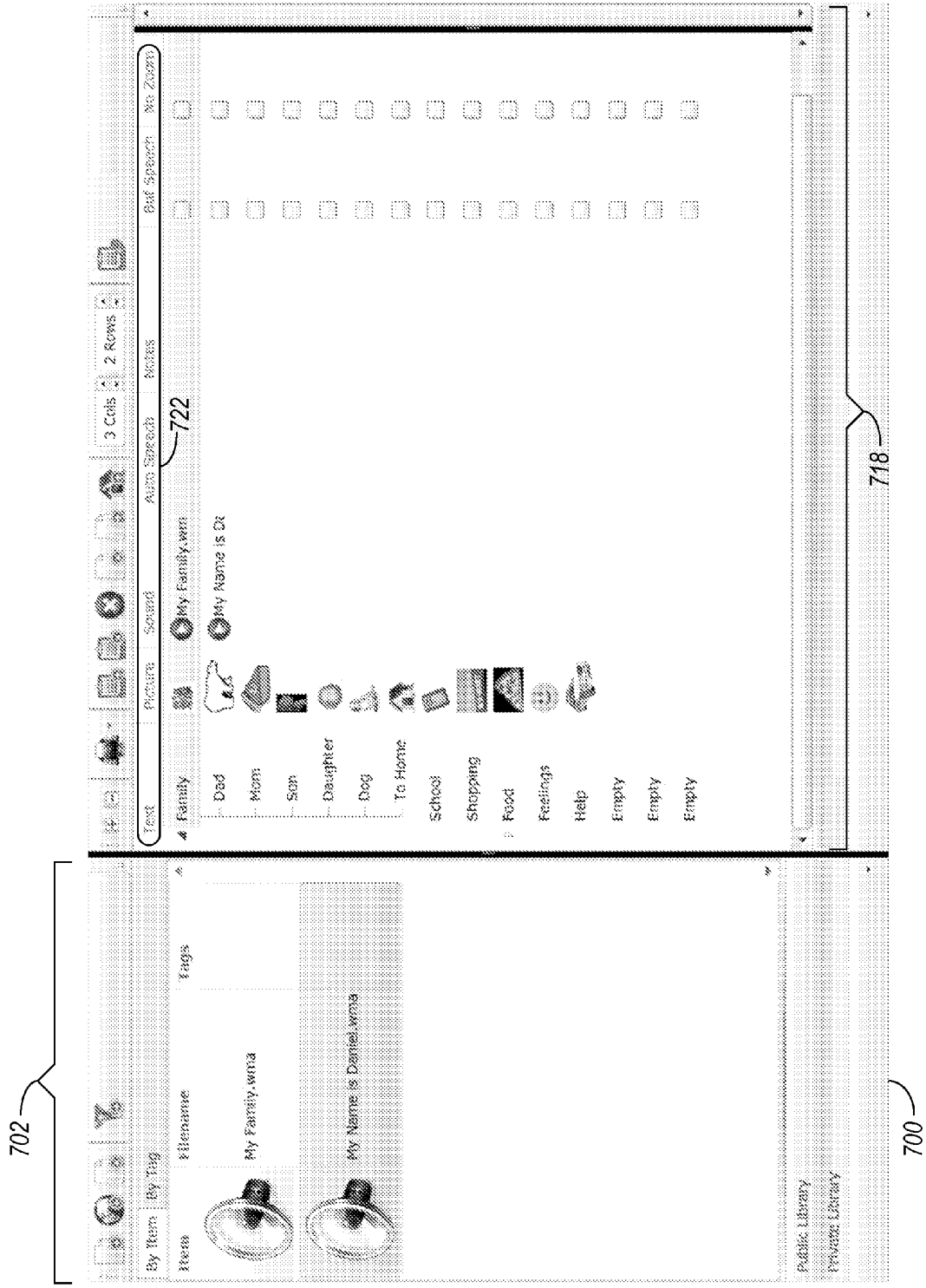

In some embodiments, the navigation panel 718 may include additional areas for denoting additional expressive content and information besides text, picture, and sound. This is illustrated in FIG. 7E, where the navigation panel 718 has been expanded to reveal the full extent of the area headings 722. As can be seen, there may be an Auto Speech area to indicate that text has been associated with the board via the Web-based AAC authoring tool 216, which text may then be audiblelized as synthesized speech on the wireless handheld multimedia device 102a or 102b when that board or cell is selected. A Notes area indicates that the AAC Author has entered some information or explanation intended for other AAC Authors (e.g., parent, teacher, speech and language pathologist, etc.) who may be developing expressive content for the current content selection interface. A Buffered Speech area indicates that the sound associated with the board or cell is to be buffered or queued and subsequently played back together with sounds from other boards or cells, thereby allowing a continuous and smooth sentence to be constructed from multiple sounds associated with multiple boards or cells.

The above arrangement makes it possible to easily add personalized expressive content to the content selection interface on the wireless handheld multimedia devices 102a or 102b, and to change and rearrange the appearance and available options of the content selection interface. Thus, for example, if the AAC Author wishes to add a new item of expressive content to the content selection interface, such as a special greeting reserved only for the AAC User's friends, he can do so by selecting an existing board and clicking on the appropriate icon, or starting a new board. Next, the AAC user can associate an image with the new cell, for example, by selecting the image content type and choosing an image from his personal collection. If he does not feel any of the images in his personal collection are suitable for depicting the greeting, he can search the Public Library 714 for a more suitable image. The greeting will then be added to the content selection interface and depicted using the image from the Public Library 690. The AAC Author may thereafter add an audio clip to the greeting by using his personal computer 104 to record one or by uploading an existing audio clip to the library section 702, then drag and drop the clip onto the new cell to associate the audio clip with the new greeting. When the content selection interface is subsequently downloaded to the handheld device 102a or 102b of the AAC User, the new greeting will be displayed as a new option in the content selection interface and depicted using the associated image. The AAC user may thereafter select or press the new option to play back the audio clip via the speakers of the handheld device 102a or 102b.

Figure 8:
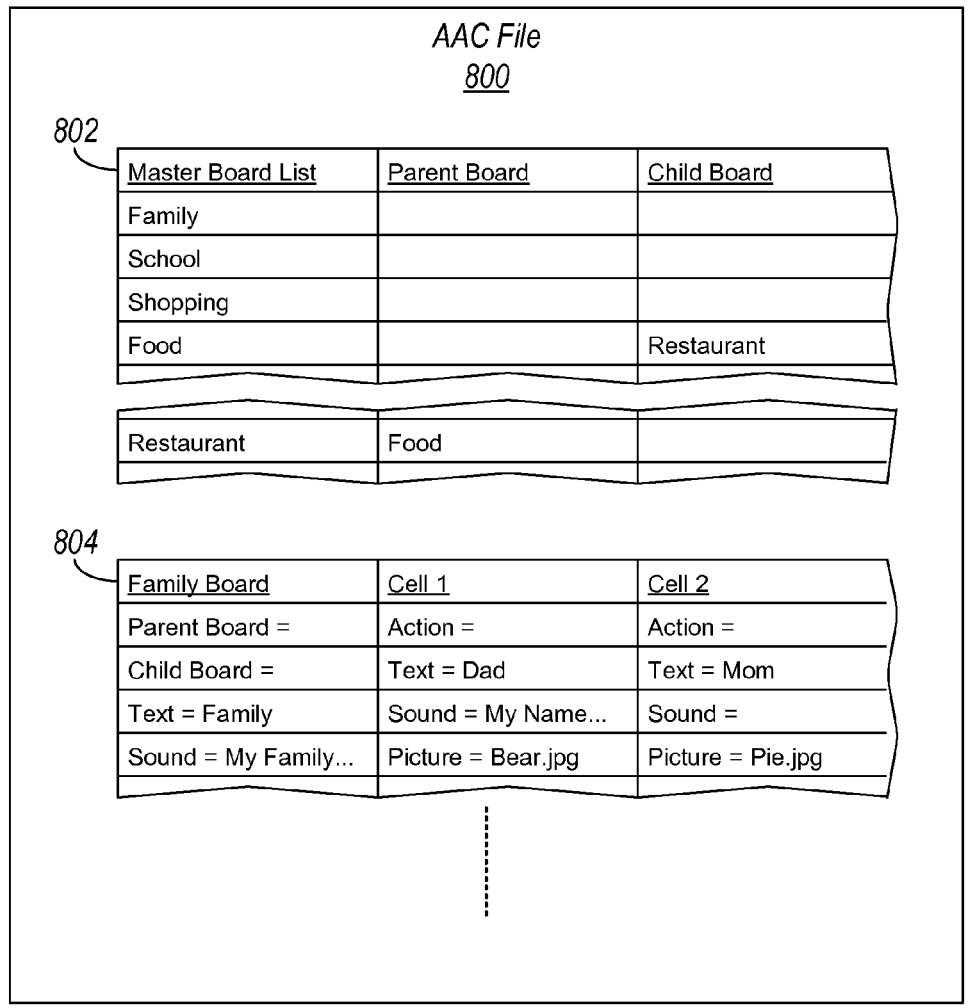
FIG. 8 illustrates an exemplary file structure for the Web-based authoring tool in accordance with the systems and methods of the present disclosure.

Once the content selection interface and the expressive content therefor have been customized and personalized, they may be saved on the Web server 108 in an AAC file. FIG. 8 illustrates an exemplary file structure for an AAC file 800 for the Web-based AAC authoring tool 216 in accordance with the systems and methods of the present disclosure. Any suitable file structure may be used for the AAC file 800 so long as the AAC file 800 contains sufficient information such that when the AAC file 800 is downloaded and synchronized to a wireless handheld multimedia device 102a or 102b, the AAC application on the device can reproduce the content selection interface from the AAC file. Likewise, when the AAC file 800 is uploaded and synchronized to the Web server 108, the AAC authoring tool 216 should be able to re-create the content selection interface from the AAC file. In some embodiments, synchronization may be performed by simply replacing the entire AAC file 800 on either the wireless handheld multimedia device 102a or 102b or the Web server 108, or it may be performed by scanning the AAC file 800 and replacing only the portions thereof that have been updated (i.e., merge the two AAC files 800). Such synchronization of files is well known to those having ordinary skill in the art and is therefore not described in detail here. In this regard, the timestamps of the AAC file 800 should reflect universal time in order to accommodate differences in time zones around the world so that it will be clear which version of the AAC file 800 or which elements in the file is more recent.

As can be seen in FIG. 8, in one implementation, the AAC file 800 may achieve the above objectives by including a master board table 802 composed of at least a listing of all the boards in the content selection interface, as well as information concerning any parent board (i.e., board in which the subject board is nested) and/or any child board (i.e., board that is nested in the subject board). In addition, the AAC file 800 may further include individual board tables, one of which is shown at 804, containing various items of information pertaining to each table and the cells therein. For example, the individual board table 804 may include information about any parent board, child board, the expressive contents associated with the board, the expressive contents associated with each cell in the board, whether any cell has a board associated therewith, and the like. A timestamp, which may reflect Greenwich Mean Time, may be provided for each distinct element in the master board table 802 and the individual board table 804 to reflect when the element was last modified.

In some embodiments, the ACC file may be a self-describing text-based file format that uses the widely accepted XML (Extensible Markup Language) standards for representing expressive content. An example of such an AAC file is included as a computer program listing appendix in the current disclosure and is hereby incorporated by reference. Such an AAC file makes it possible to transmit (e.g., via e-mail) the content selection interface and the expressive content therefor over networks and to synchronize or merge multiple AAC files. The AAC file preferably includes a Universal Time Coordinated timestamp with each expressive content element, which allows speech and language pathologist, teachers, parents and children to all collaborate off-line and then merge their solutions later. In addition, the XML format of the AAC file makes it possible to efficiently store multiple references to the same expressive content (see, e.g., the "z:Ref" elements), and also allows AAC content authoring and play back on multiple wired and wireless handheld multimedia devices 102a and 102b, including game consoles, mobile devices, smart phones, computers, and other wireless handheld devices 102a and 102b.

Figure 9:
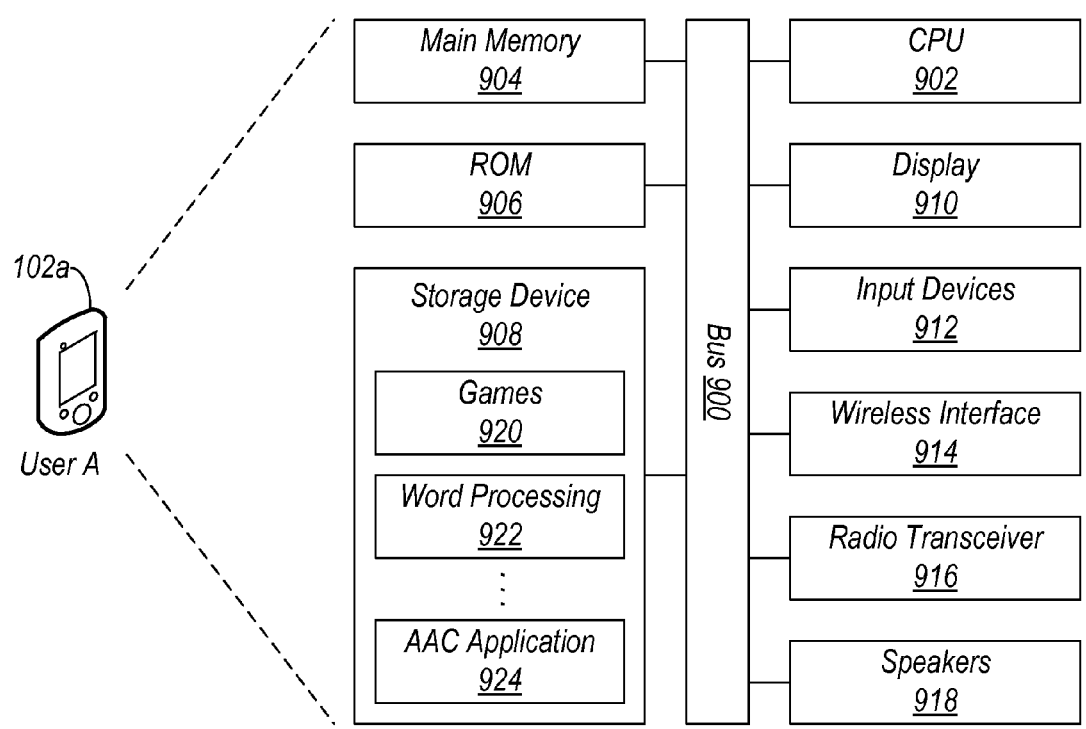
FIG. 9 illustrates an exemplary wireless handheld multimedia device that may be used with the systems and methods of the present disclosure.

Wireless Handheld Multimedia Device Application:

FIG. 9 illustrates one of the wireless handheld multimedia devices 102a in more detail. As can be seen, the wireless handheld multimedia device 102a typically includes a bus 900 for transferring information and a CPU 902 coupled to the bus 900 for processing the information. The handheld device 102a may also include a random access memory (RAM) as a main memory 904 coupled to the bus 900 for storing computer readable instructions to be executed by the CPU 902. The main memory 904 may also be used for storing temporary variables or other intermediate information during execution of the instructions to be executed by the CPU 902. The wireless handheld multimedia device 102a may further include a read only memory (ROM) 906 or other static storage device coupled to the bus 900 for storing static information and instructions for the CPU 902. A computer readable storage device 908, such as a magnetic disk or optical disk, may be coupled to the bus 900 for storing information and instructions for the CPU 902.

The CPU 902 may also be coupled to a display 910 via the bus 900, such as a liquid crystal display (LCD), cathode ray tube (CRT), and the like for displaying information to a user. Preferably the display 910 is a touchscreen display, but this is not an absolute requirement for implementation of the embodiments disclosed herein. One or more input devices 912, such as alphanumeric and other keyboards, mouse, trackball, cursor direction keys, and so forth, may be coupled to the bus 900 for communicating information and command selections to the CPU 902. A wireless interface 914 implements the various wireless communication protocols required between the wireless handheld multimedia device 102a and a wireless service provider therefor. Examples of such wireless communication protocols include 4G, 3G, GSM, GPRS, EDGE, HSDPA, and the like. A radio transceiver 916 in the handheld device 102a transmits and receives the radio frequency signals to and from the wireless service provider. These components are generally well known in the art and need not be described in detail here. Speakers 918 are provided in the wireless handheld multimedia device 102a for reproducing the audio component of any expressive content.

As mentioned above, the wireless handheld multimedia device 102a is capable of installing and running various applications, including multimedia applications. This is reflected in FIG. 9, where the storage device 908 is shown as having games 920, word processing 922, and other types of applications stored thereon. The ability to run multiple applications results in the handheld device 102a being widely accepted and popular among many segments of the population. In accordance with the disclosed embodiments, an AAC application 924 (or rather the computer-readable instructions therefor) may also reside on the storage device 908. Such computer-readable instructions may be downloaded to the handheld device 102a, for example, from an online software retailer or store. The computer-readable instructions for the AAC application 924 may then be executed by the CPU 902 and/or other components of the wireless handheld multimedia device 102a to allow an AAC User to display or play back personalized expressive content using a customized content selection interface. Such an AAC application 924 may be implemented using any suitable application development environment and programming language known to those having ordinary skill in the art, depending on the particular type of wireless handheld multimedia device. For example, an iPhone software development kit (SDK) may be used where the handheld device 102a is an iPhone, a Blackberry SDK may be used where the handheld device 102a is a Blackberry, and so forth for other handheld devices.

Figure 10:
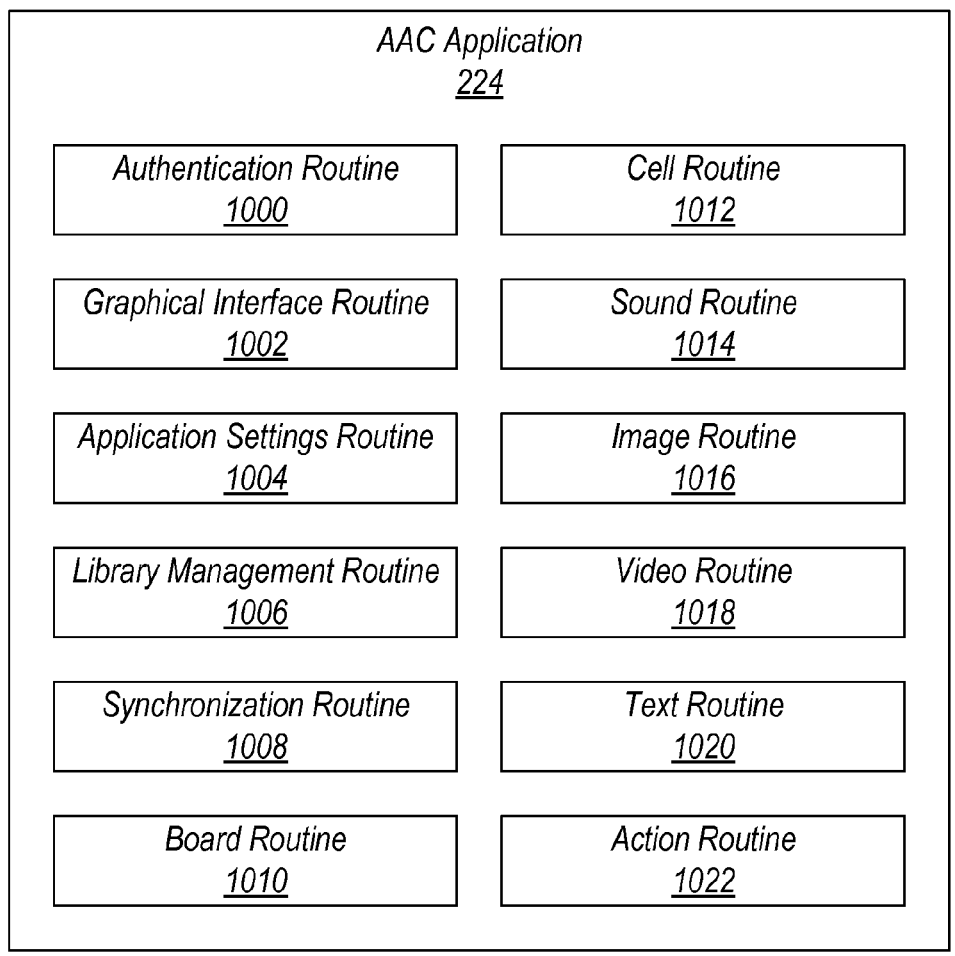
FIG. 10 illustrates an exemplary wireless handheld multimedia device application in accordance with the systems and methods of the present disclosure.

Referring to FIG. 10, in one implementation, the AAC application 924 may comprise a number of functional components that operate in conjunction with one another. These functional components of the AAC application 924 may include, for example, an authentication routine 1000, a graphical interface routine 1002, an application settings routine 1004, a library management routine 1006, a synchronization routine 1008, and a board routine 1010. Other functional components in the AAC application 924 may include a cell routine 1012, a sound routine 1014, an image routine 1016, a video routine 1018, a text routine 1020, and an action routine 1022. These functional components 1000-1022 provide similar functionality to their counterpart components in the Web server 108 described above, but adapted for the capabilities and limitations of the wireless handheld multimedia device 102a. For example, as discussed above, it may be desirable in some instances to restrict the direction of synchronization so that newly created boards may be synchronized from the Web server 108 down to the wireless handheld multimedia device 102a, but not vice versa, while allowing changes to existing boards to be synchronized unrestricted.

Figure 11:
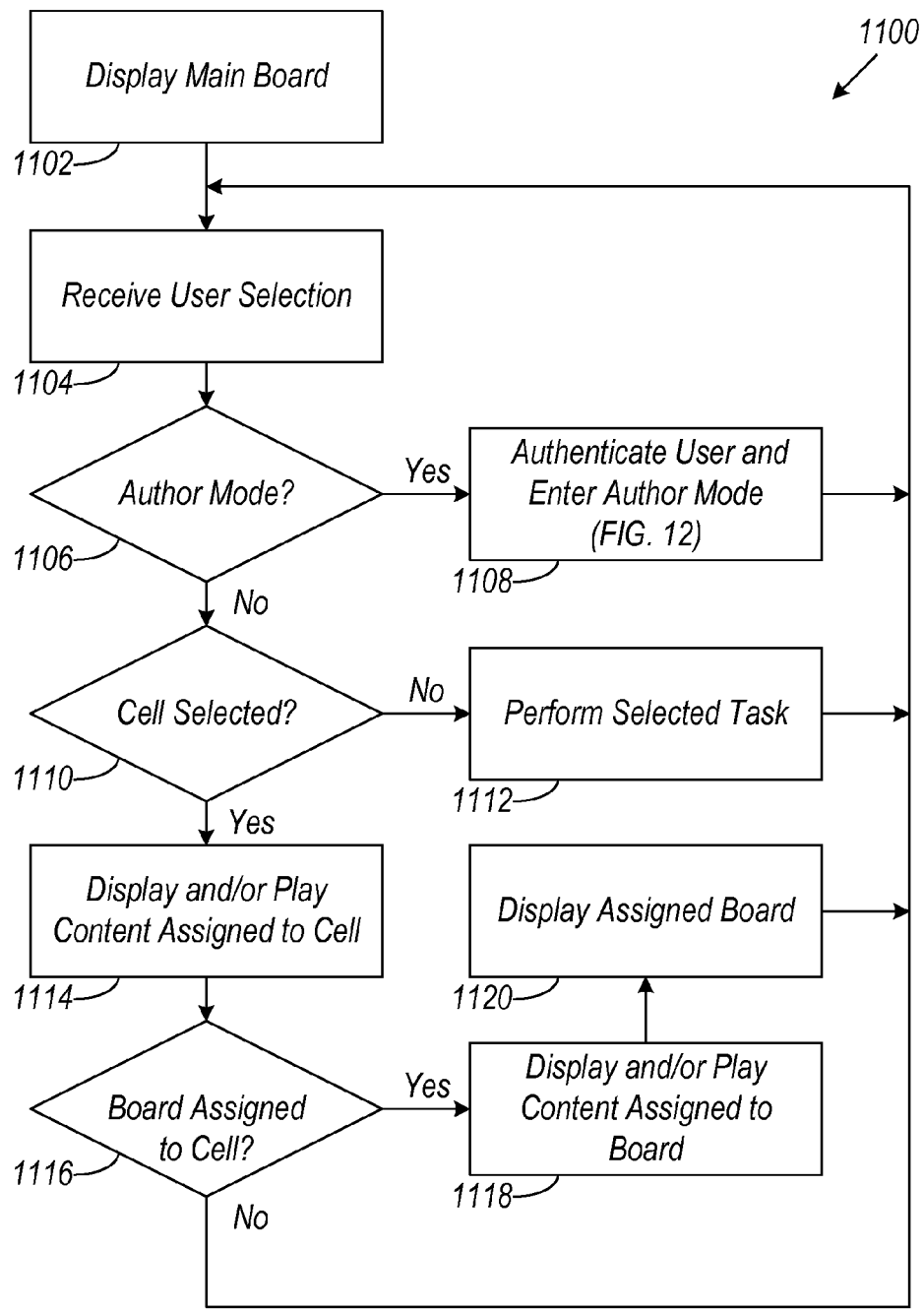
FIG. 11 illustrates an exemplary flowchart for the wireless handheld multimedia device application in accordance with the systems and methods of the present disclosure.

Operation of the AAC application 924 is illustrated generally in FIG. 11 via a flowchart 1100 for an exemplary method of displaying and playing back, as well as adding and editing, personalized expressive content and customizing the content selection interface. The flowchart 1100 and subsequent flowcharts assume that the wireless handheld multimedia device 102a includes a touchscreen display, but adjustments may certainly be made for other types of displays without departing from the disclosed embodiments.

As can be seen, the method begins at block 1102 where the AAC User is presented with the top level board of the content selection interface, which may be similar to the "Starter Board" board 616 from FIG. 6A or the main board 721 from FIG. 7A. At block 1104, the AAC User's input is received and processed by the AAC application 924. At block 1106, a determination is made as to whether the input received from the AAC User invokes an author mode and, if yes, the AAC Author is authenticated and allowed to proceed to the author mode at block 1108. If no, then a determination is made at block 1110 as to whether the input received from the AAC User was a selection of a cell and, if no (meaning some other task was selected), then whatever task was selected by the AAC User is performed at block 1112, and the flowchart 1100 returns to block 1104 to await further input. If yes, then the flowchart 1100 proceeds to block 1114, where the expressive content assigned to the selected cell is displayed and/or played back. At block 1116, a determination is made as to whether a board was assigned to the selected cell and, if yes, the expressive content assigned to the board is displayed and/or played back at block 1118, the board assigned to the cell is displayed at block 1120. If no, then the flowchart 1100 returns to block 1104 to await further input from the AAC User.

Figure 12:
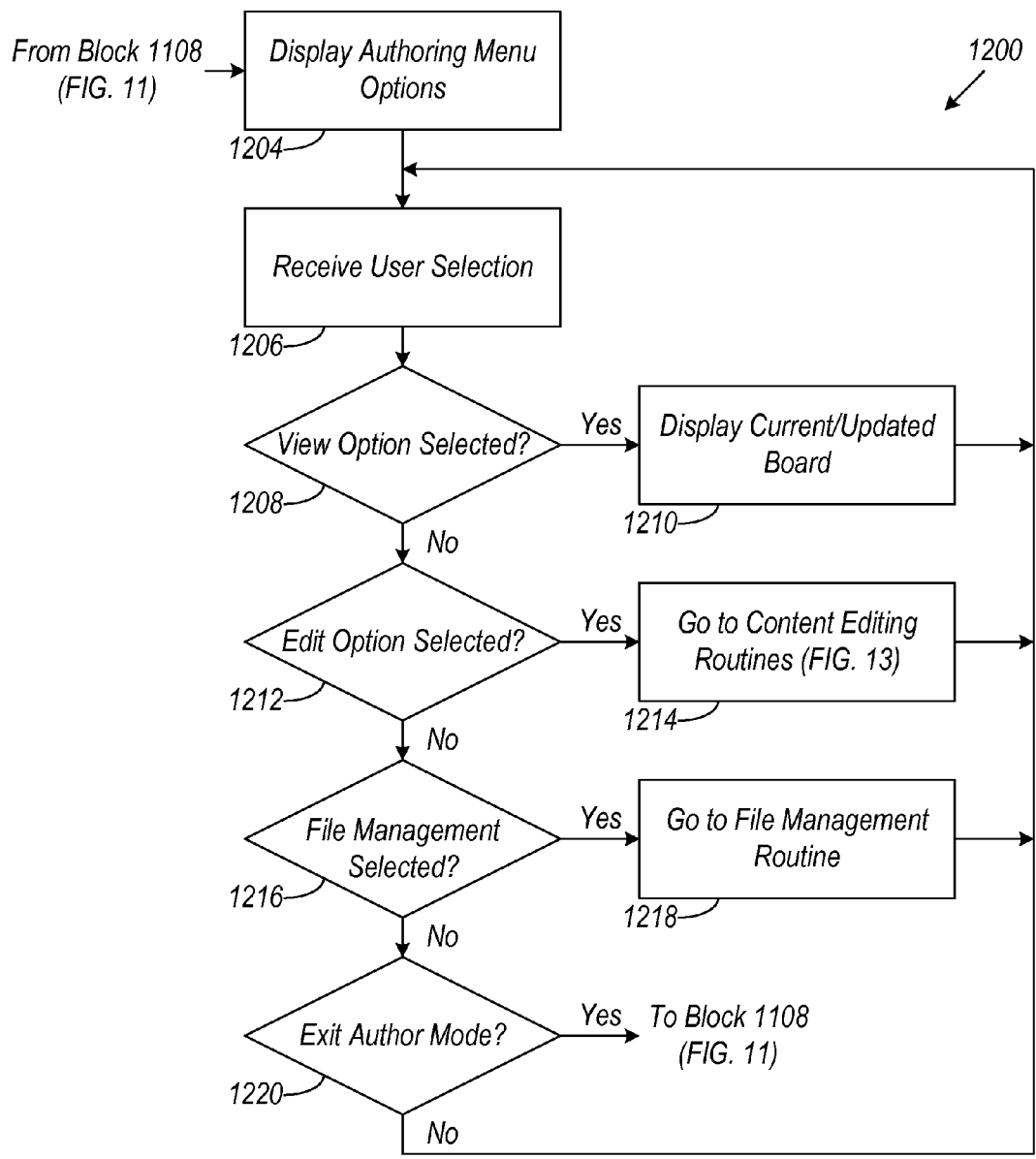
FIG. 12 illustrates another exemplary flowchart for the wireless handheld multimedia device application in accordance with the systems and methods of the present disclosure.

FIG. 12 illustrates the author mode block 1108 from FIG. 11 in more detail via a flowchart 1200. As can be seen, upon entering author mode, the AAC User is presented with an authoring menu or buttons at block 1204, which may be located along the bottom of the screen display beneath the currently displayed board in some implementations. At block 1208, a determination is made as to whether the AAC User has selected a view option and, if yes, the flowchart 1200 proceeds to block 1210 where the display screen of the wireless handheld multimedia device 102a is refreshed with either the current or an updated board if changes have been made. If no, then a determination is made at block 1212 as to whether the input received from the AAC User invokes an edit function and, if yes, the flowchart 1200 proceeds to block 1214 where the appropriate editing routines are initiated, as discussed below in connection with FIG. 13. If no, then at block 1216, a determination is made as to whether the input from the AAC User invokes the library management function and, if yes, the flowchart 1200 proceeds to block 1218 where the library management routines are initiated. If no, then at block 1220, a determination is made as to whether the AAC User wishes to leave the author mode and, if yes, the AAC User is logged out and the flowchart 1200 returns to the author mode block 1108 of FIG. 11. If no, then the flowchart 1200 returns to block 1206 to await the next input from the AAC User.

Figure 13:
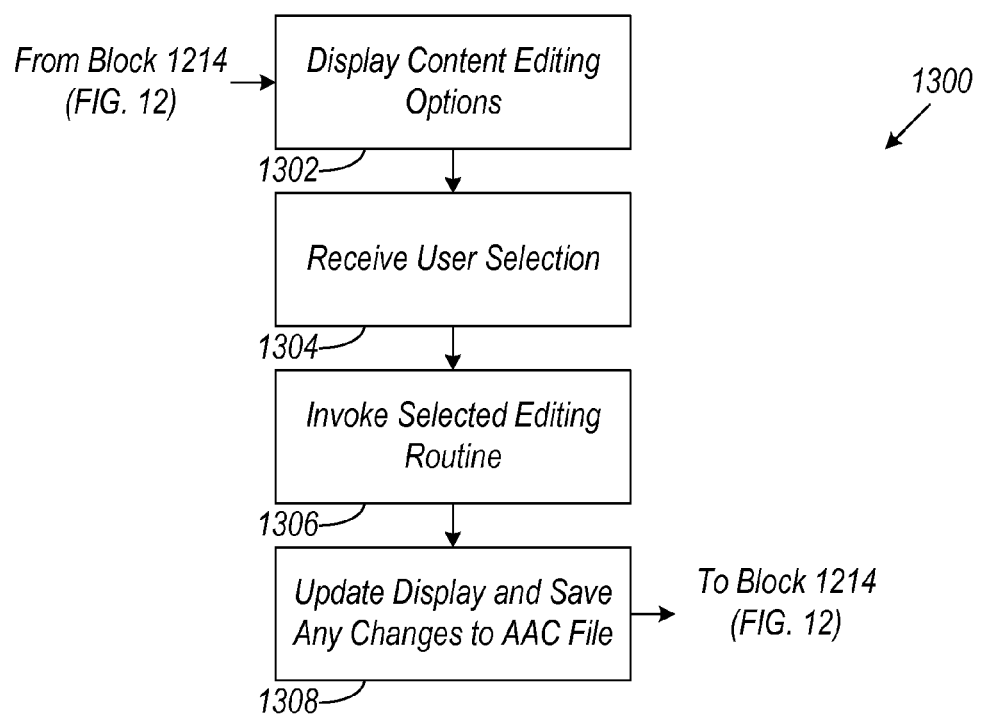
FIG. 13 illustrates yet another exemplary flowchart for the wireless handheld multimedia device application in accordance with the systems and methods of the present disclosure.

FIG. 13 illustrates the editing function of the AAC application 924 in more detail via a flowchart 1300. Once editing is entered at block 1214 from FIG. 12, a plurality of editing options is displayed to the AAC User at block 1302. These editing options may include adding/changing boards and cells and the sounds, images, videos, text, and other expressive content associated with the boards and cells. At block 1304, the editing option selected by the AAC User is received, and the proper editing routine (e.g., boards, cells, sounds, images, video, or text routine) is invoked at block 1306. After the selected editing routine is finished, the flowchart 1300 proceeds to block 1308 where the display screen is refreshed to display any updates to the expressive content and/or content selection interface. The flowchart 1300 thereafter returns to block 1214 (see FIG. 12) to continue with other authoring tasks that the AAC User may wish to perform.

Figures 14A, 14B:
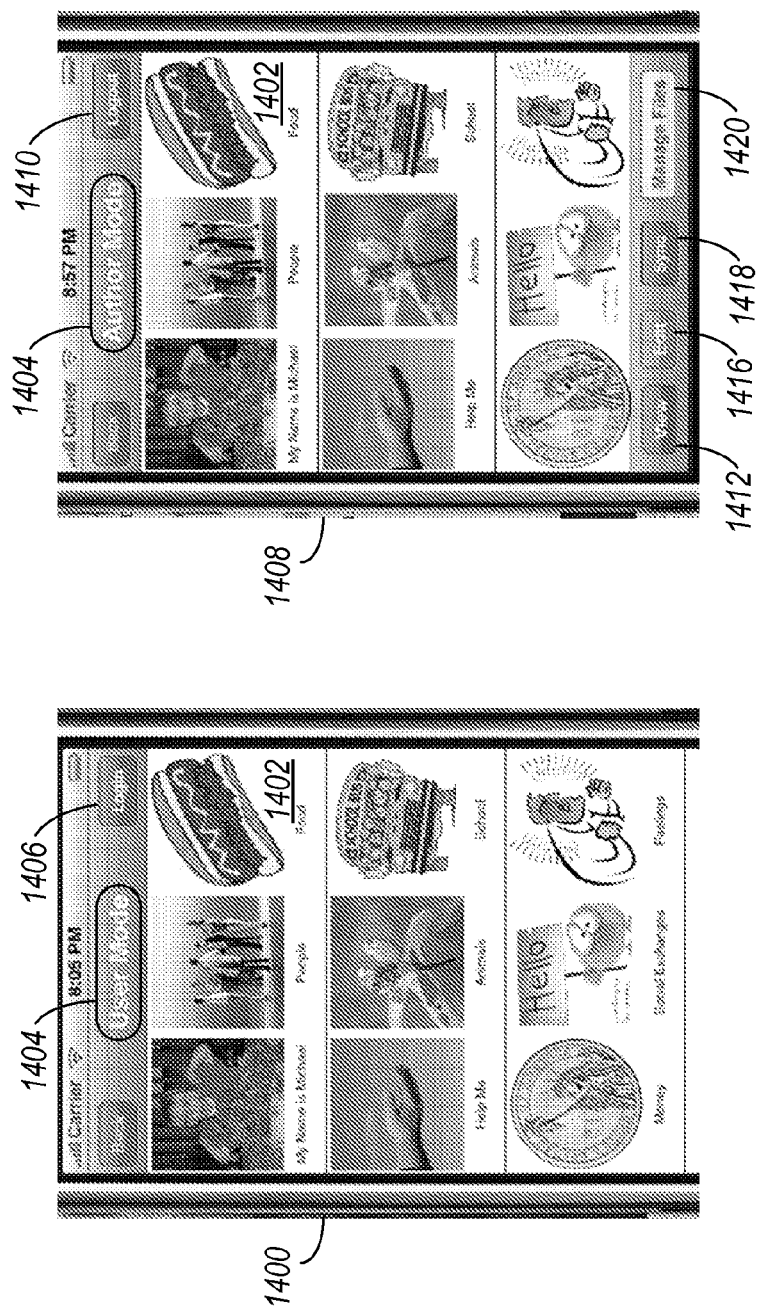

Referring now to FIGS. 14A-14M, an exemplary content selection interface for an AAC User is shown that implements the methods of the AAC application 924 discussed above. As can be seen in FIG. 14A, upon accessing the AAC application 924 on the handheld wireless device 102a, the AAC User may be presented with a main screen 1400 having a plurality of cells or boards therein, one of which is indicated at 1402 (the "Food" board) for illustrative purposes. In general, a cell may be distinguished from a board in the content selection interface by the use of a different font color, underlining, and/or bolding for the names of the boards. A mode indicator 1404 may be displayed above the main screen 1400 for indicating which one of two modes, User Mode and Author Mode, the AAC application 924 is currently operating. Note that the AAC application 924 typically begins in the User Mode by default.

Selecting a Login button 1406 and providing the proper authentication credentials brings up an authoring screen 1408, as shown in FIG. 14B. Displaying this screen 1408 indicates that the AAC User has entered the Author Mode, as now indicated by the mode indicator 1404. The authoring screen 1408 is essentially the same as the main screen 1400 except that the Login button 1406 is replaced with a Logout button 1410 and a plurality of authoring menu options are now present across the bottom of the screen. These menu options may include a View option 1412 for allowing the AAC User to view whatever changes he had just made within the perspective of a board (i.e., how the change would look in User Mode). Also present may be an Edit option 1416 for editing or adding expressive content to a selected cell or board, and a Sync option 1418 for synchronizing any changes the AAC User made to the expressive content and/or the content selection interface on the wireless handheld multimedia device 102a with the expressive content and/or the content selection interface on the Web server 108. A Manage Files option 1420 allows the AAC User to add and remove expressive content files from the wireless handheld multimedia device 102a.

Figures 14C, 14D, 14E:
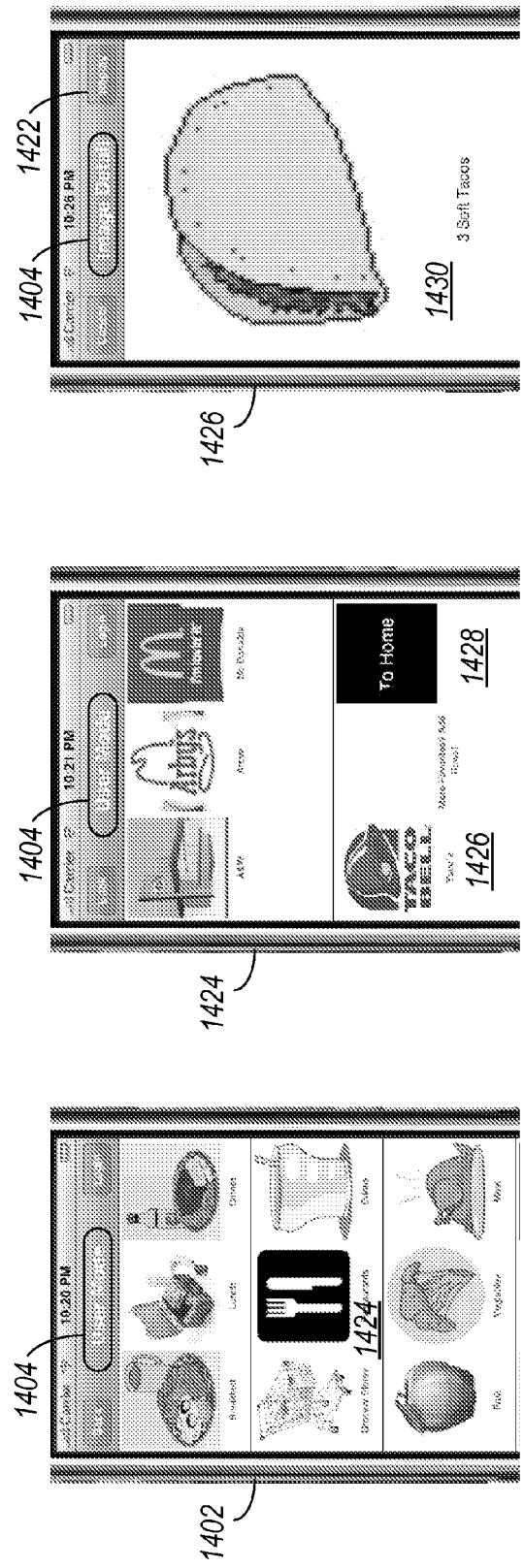

FIGS. 14C-14E illustrate an example of using the content selection interface in User Mode on the wireless handheld multimedia device 102a. Starting with FIG. 14C, the AAC User has selected the "Food" board 1402, which brings up the various cells and boards associated with that board 1402, one of which is labeled as 1424 (the "Restaurant" board) for illustrative purposes. Moving next to FIG. 14D, selection of the "Restaurant" board 1424 brings up additional cells associated with that board 1424, including a cell labeled as 1426 (the "Taco Bell" cell) for illustrative purposes. Note that a special navigation cell 1428 (the "To Home" cell) has been provided in the "Restaurant" board 1424. Recall that this "To Home" cell 1428 is configured to conveniently return the AAC User back to the main screen 1400 when pressed. In FIG. 14E, selection of the "Taco Bell" cell 1426 causes the expressive content associated with that cell, including an enlarged image of a taco and the words "3 Soft Tacos," to be displayed and/or played back. This allows the AAC User, for example, to order three tacos from Taco Bell by both showing the taco image to the Taco Bell attendant and/or playing the audio clip for the attendant. In some embodiments, there may also be video content associated with the cell 1426, such as a prerecorded video of someone requesting three soft tacos. Where sound or video content is present, a replay button 1422 may be provided for replaying the sound content as needed.

An example of using the content selection interface in Author Mode is illustrated in FIGS. 14F-14M. Here, the AAC User has selected a miscellaneous board 1432 for editing. As can be seen in FIG. 14F, at least some of the cells of the board 1432 are empty cells, including one labeled as 1434 for illustrative purposes. At this point, the AAC User may choose to edit an empty cell or one that has expressive content associated therewith. Selecting the empty cell 1434, for example, and pressing on the Edit option 1416 brings up a content editing screen 1436, as shown in FIG. 14G, for allowing the AAC User to add content to the selected cell (or board). This content editing screen 1436 may have a number of content adding options, including an Image button 1438 for adding images, a Sound button 1440 for adding sounds, a Text button 1442 for adding text, an Action button 1444 for adding a board, and a "To Home" button 1446 for adding a "To Home" cell to the empty cell 1434. Additional buttons that may be present in the content editing screen 1436 may include a Delete Cell button 1448 for removing a cell from the board, a Delete Action button 1450 for removing a board from a cell, and a Copy Cell button 1452 for copying a cell and subsequently pasting it to another cell. The same or a similar content editing screen 1436 may also be used for editing non-empty cells by replacing existing expressive content with new content.

Referring next to FIG. 14H, selection of the Image button 1438 brings up an image options screen 1454, as indicated by the screen indicator 1455, for allowing the AAC User to add an image to the selected cell (or board). This image options screen 1454 may include several options for adding an image to the selected cell (or board), depending on the type and capability of the wireless handheld multimedia device 102a. For example, for the iPhone™ from Apple, Inc., the image options screen 1454 may include an iPhone Photo Folder button 1456 from which the AAC User may retrieve all images and photos stored in any folder on the device 102a. An Application Photo Folder button 1458 allows the AAC User to retrieve images and photos directly from the folder of the AAC application 924. An iPhone Camera button 1460 allows the AAC User to add an image or photo on the spot using the iPhone's built-in camera. This option is particularly useful where no images have been found that suit a particular expressive content, so the AAC user (or his support person) may create a new image by taking a picture. A Screenshot From Web button 1462 allows the AAC User to capture and add an image or photo from the Web. A From Scribe button 1464 allows the AAC User to add an image or drawing using a scribe application. Finally, the AAC User may simply choose to delete any image or photo currently associated with the selected cell (or board) via the Delete Current Image button 1466.

FIG. 14I shows that the AAC User has selected the iPhone Photo Folder button 1456, which brings up an images library 1468 containing the AAC User's images and photos, one of which is labeled as 1470 for illustrative purposes. The AAC User may then press or click on this image 1470 to add it to the selected cell. Pressing the View button 1412 allows the AAC User to view the recently added image 1470 in the context of the miscellaneous board 1432, as shown in FIG. 14J. A similar process may be followed for adding images via the other image option buttons 1458-1464 of the image options screen 1454.

Referring to FIG. 14K, selection of the Sound button 1440 from the content editing screen 1436 (see FIG. 14G) brings up a sound options screen 1472, as indicated again by the screen indicator 1455. Like the image options screen 1454, the sound options screen 1472 may also include several options for adding sound to the selected cell (or board), depending on the type and capability of the wireless handheld multimedia device 102a. With the iPhone™ as an example again, the sound options screen 1472 may include a Record Sound button 1474 for allowing the AAC User to record a new sound file, and a Sound File button 1476 for allowing the AAC User to retrieve a prerecorded sound file from a sound library as shown in FIG. 14K. Selecting the Record Sound button 1474 brings up a sound recording screen 1478 with standards sound recording buttons, including a Record button 1480, a Stop button 1482, and a Play button 1484, as shown in FIG. 14L. Once the AAC User has finished recording the sound file, selecting the Save button 1485 brings up a text entry box 1486 and an on-screen keyboard 1488 for allowing the AAC User to give the newly recorded audio file a filename. Retrieving a sound file via the Sound File button 1476 may be accomplished in a manner similar to the process used above.

Likewise, a similar process may be followed for the other options 1442-1452 of the content editing screen 1436 and therefore a detailed description thereof will not be provided here for economy of the description.

While the disclosed embodiments have been described with reference to one or more particular implementations, those skilled in the art will recognize that many changes may be made thereto. For example, the specific location and selection of the various icons for the graphical interfaces illustrated in FIGS. 6A-6I and 7A-7E may be rearranged as needed without departing from the scope of the disclosed embodiments. Therefore, each of the foregoing embodiments and obvious variations thereof is contemplated as falling within the spirit and scope of the disclosed embodiments, which are set forth in the following claims.

What is claimed is:

1. A method of modifying augmentative and alternative communication (AAC) content for an AAC user, comprising: transmitting a transmission signal by a network server over a first network connection to a personal computer, the transmission signal representing a graphical interface that is displayed on the personal computer, the graphical interface allowing an AAC author to indicate one or more changes to be made to one or more of a plurality of AAC content associated with an AAC content selection interface on the network server using a standard keyboard and a pointing device on the personal computer; receiving a reception signal from the personal computer over the first network connection by the network server, the reception signal representing the changes to the AAC content associated with the AAC content selection interface indicated by the AAC author; modifying the AAC content associated with the AAC content selection interface by the network server according to the changes indicated by the AAC author; transmitting the AAC content associated with the AAC content selection interface that has been modified by the network server over a second network connection to a handheld multimedia device of the AAC user, the AAC content selection interface having a plurality of user-selectable options for allowing the AAC user to select which one of the plurality of ACC content associated with the AAC content selection interface to display or play back on the handheld multimedia device, the ACC content designed to help a non-ACC user understand a request from the ACC user; modifying the AAC content associated with the AAC content selection interface on the network server according changes indicated by a second AAC author; and transmitting the AAC content associated with the AAC content selection interface that has been modified as indicated by the second AAC author to the handheld multimedia device of the AAC user; wherein the AAC authors are different from the AAC user.

2. The method of modifying AAC content according to claim 1, wherein the reception signal additionally represents changes to the AAC content selection interface indicated by the AAC author, further comprising modifying the AAC content selection interface on the network server as indicated by the AAC author.

3. The method of modifying AAC content according to claim 1, further comprising synchronizing AAC content on the network server that has been modified with AAC content on the handheld multimedia device.

4. The method of modifying AAC content according to claim 1, wherein the network server is a Web server and the network connection is an Internet connection.

5. The method of modifying AAC content according to claim 1, wherein the modifying of the AAC content associated with the AAC content selection interface occurs in real time.

6. A system for modifying AAC content for an AAC user, comprising:
 a processor;
 a storage device in communication with the processor, the storage device having computer-readable introductions stored thereon, the computer-readable introductions comprising instructions for causing the processor to carry out the method according to claim 1.

7. A method of providing augmentative and alternative communication (AAC) content to an AAC user, comprising: receiving a reception signal from a network server over a network connection by a handheld multimedia device of the AAC user, the reception signal representing one or more updates selected by an AAC author to one or more of a plurality of AAC content associated with an AAC content selection interface stored on the handheld multimedia device; updating the AAC content associated with the AAC content selection interface by the handheld multimedia device according to the one or more updates selected by the AAC author; receiving a reception signal from the network server over the network connection by the handheld multimedia device of the AAC user, the reception signal representing one or more updates selected by a second AAC author to one or more of a plurality of AAC content associated with an AAC content selection interface stored on the handheld multimedia device; updating the AAC content associated with the AAC content selection interface by the handheld multimedia device according to the one or more updates selected by the second AAC author; storing updated AAC content associated with the AAC content selection interface by the handheld multimedia device; presenting the AAC content selection interface with the updated AAC content associated therewith by the handheld multimedia device to the AAC user, the AAC content selection interface having a plurality of user-selectable options for allowing the AAC user to select which one of the plurality of ACC content associated with the AAC content selection interface to be displayed or played back on the handheld multimedia device, the ACC content designed to help a non-ACC user understand a request from the ACC user; receiving an input from the AAC user by the handheld multimedia device via the AAC content selection interface; and displaying or playing back the AAC content by the handheld multimedia device upon receiving the input from the AAC user; wherein the AAC authors are different from the AAC user.

8. The method of providing AAC content according to claim 7, wherein the AAC user is a first AAC user and the handheld multimedia device is a first handheld multimedia device, further comprising:
 receiving a reception signal from the network server over the network connection at a second handheld multimedia device of a second AAC user, the reception signal representing one or more updates selected by the AAC author to one or more of a plurality of AAC content associated with the AAC content selection interface stored on the second handheld multimedia device;
 updating the AAC content associated with the AAC content selection interface on the second handheld multimedia device according to the one or more updates selected by the AAC author.

9. The method of modifying AAC content according to claim 7, further comprising synchronizing the AAC content selection interface on the network server with the AAC content selection interface on the handheld multimedia device.

10. The method of providing AAC content according to claim 9, wherein the synchronization of the AAC content selection interface on the network server and the AAC content selection interface on the handheld multimedia device occurs only from the network server to the handheld multimedia device and not vice versa.

11. The method of providing AAC content according to claim 7, wherein the AAC content selection interface is stored in a self-describing XML-based file format that is used by multiple AAC users on multiple types of handheld multimedia devices, further comprising merging the AAC content selection interface from the multiple types of handheld multimedia devices.

12. The method of providing AAC content according to claim 7, wherein the handheld multimedia device is primarily a non-AAC device that is capable of running multiple different applications.

13. The method of providing AAC content according to claim 7, further comprising allowing the AAC user to change the AAC content associated with the AAC content selection interface on the handheld multimedia device and uploading the AAC content associated with the AAC content selection interface that has been changed to the network server over the network connection.

\* \* \* \* \*